US012804626B2

(12) United States Patent
Wang et al.

(10) Patent No.: US 12,804,626 B2
(45) Date of Patent: Nov. 17, 2026

(54) CARRIER MANAGEMENT METHOD, RESOURCE ALLOCATION METHOD AND RELATED DEVICES

(71) Applicant: SAMSUNG ELECTRONICS CO., LTD., Suwon-si (KR)

(72) Inventors: Shoufeng Wang, Beijing (CN); Junyi Yu, Beijing (CN); Wei Gao, Beijing (CN); Sheng Lei, Beijing (CN); Xiaohui Yang, Beijing (CN); Nan Cao, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 490 days.

(21) Appl. No.: 18/316,677

(22) Filed: May 12, 2023

(65) Prior Publication Data

US 2023/0284194 A1 Sep. 7, 2023

Related U.S. Application Data

(63) Continuation of application No. PCT/KR2022/007071, filed on May 17, 2022.

(30) Foreign Application Priority Data

May 21, 2021 (CN) ......................... 202110560695.9
Jul. 21, 2021 (CN) ......................... 202110827114.3

(51) Int. Cl.
*H04W 72/0453* (2023.01)
*H04B 17/318* (2015.01)
(Continued)

(52) U.S. Cl.
CPC ...... *H04W 72/0453* (2013.01); *H04B 17/328* (2023.05); *H04L 1/0003* (2013.01); *H04W 52/367* (2013.01)

(58) Field of Classification Search
CPC ........... H04W 72/0453; H04W 52/367; H04L 1/0003
(Continued)

(56) References Cited

U.S. PATENT DOCUMENTS 9,736,765 B2 8/2017 Yiu et al.
9,848,356 B2 12/2017 Huh et al.
(Continued)

FOREIGN PATENT DOCUMENTS

CN 108370295 8/2018
EP 2273716 10/2012
(Continued)

OTHER PUBLICATIONS

Partial European Search Report dated Sep. 18, 2024 issued in European Patent Application No. 22804968.0.
(Continued)

*Primary Examiner* — Asad M Nawaz
*Assistant Examiner* — Hugh Mark Ashley
(74) *Attorney, Agent, or Firm* — NIXON & VANDERHYE P.C.

(57) ABSTRACT

The disclosure relates to a 5$^{th}$ Generation (5G) or 6$^{th}$ Generation (6G) communication system for supporting a higher data transmission rate. Embodiments of the present disclosure provide a carrier management method, a resource allocation method and related devices, relating to the technical field of communication. The carrier management method comprises: receiving an access request from a user equipment (UE); and, determining, from candidate component carriers (CCs), a primary cell (Pcell) of the UE based on the per-resource block (RB) throughput corresponding to each candidate CC. The resource allocation method comprises: acquiring at least one candidate allocation strategy for allocating service data to be allocated to at least one candidate CC; determining throughout information and
(Continued)

transmission delay related information corresponding to the at least one candidate allocation strategy; determining a target allocation strategy based on the throughput information and the transmission delay related information; and, allocating the service data to be allocated based on the target allocation strategy. In accordance with the embodiments of the present disclosure, it is advantageous to improve the transmission efficiency. Moreover, the methods executed by electronic devices can be executed by artificial intelligence models.

19 Claims, 24 Drawing Sheets

(51) Int. Cl.
*H04L 1/00* (2006.01)
*H04W 52/36* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 10,327,112 | B2 | 6/2019 | Fjelberg et al. | |
| 10,952,083 | B2 | 3/2021 | Novlan et al. | |
| 2014/0161058 | A1* | 6/2014 | Sundaresan | H04L 5/001 370/329 |
| 2014/0293947 | A1 | 10/2014 | Nishikawa et al. | |
| 2015/0139092 | A1 | 5/2015 | Guo | |
| 2015/0256303 | A1 | 9/2015 | Belghoul et al. | |
| 2015/0341945 | A1* | 11/2015 | Panchal | H04L 5/0098 370/329 |
| 2018/0041390 | A1 | 2/2018 | Saavedra | |
| 2018/0152944 | A1 | 5/2018 | Kumar et al. | |
| 2019/0268061 | A1* | 8/2019 | Li | H04B 17/17 |
| 2020/0113013 | A1 | 4/2020 | Kim et al. | |
| 2021/0120489 | A1 | 4/2021 | Jiang et al. | |

FOREIGN PATENT DOCUMENTS

| | | |
|---|---|---|
| EP | 3188538 | 7/2017 |
| EP | 3188538 A1 | 7/2017 |
| JP | 5940131 | 6/2016 |

OTHER PUBLICATIONS

International Search Report for PCT/KR2022/007071 mailed Sep. 7, 2022, 6 pages.

Written Opinion of the ISA for PCT/KR2022/007071 mailed Sep. 7, 2022, 5 pages.

Extended European Search Report dated Dec. 10, 2024 issued in European Patent Application No. 22804968.0.

* cited by examiner

CARRIER MANAGEMENT METHOD, RESOURCE ALLOCATION METHOD AND RELATED DEVICES

CROSS-REFERENCE TO RELATED APPLICATIONS

This application is a continuation of International Application No. PCT/KR2022/007071 designating the United States, filed on May 17, 2022, in the Korean Intellectual Property Receiving Office and claiming priority to Chinese Patent Application No. 202110560695.9, filed on May 21, 2021, in the Chinese Patent Office, and to Chinese Patent Application No. 202110827114.3, filed on Jul. 21, 2021, in the Chinese Patent Office, the disclosures of all of which are incorporated by reference herein in their entireties.

BACKGROUND

Field

The disclosure relates to the technical field of communication, and for example, to a carrier management method, a resource allocation method and related devices.

Description of Related Art

5th Generation (5G) mobile communication technologies define broad frequency bands such that high transmission rates and new services are possible, and can be implemented not only in "Sub 6 Giga hertz (GHz)" bands such as 3.5 GHz, but also in "Above 6 GHz" bands referred to as mmWave including 28 GHz and 39 GHz. In addition, it has been considered to implement 6th Generation (6G) mobile communication technologies (referred to as Beyond 5G systems) in terahertz bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive Multiple-Input and Multiple-Output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR User Equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random-access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Meanwhile, the Internet has evolved from a human-based connection network, in which humans create and consume information, to the Internet of Things (IoT), in which distributed elements, such as objects, exchange information with each other to process the information. An Internet of Everything (IoE) technique is emerging, in which a technique related to the IoT is combined with, for example, a technique for processing big data through connection with a cloud server or the like. In order to implement the IoT, various technological components are required, such as a sensing technique, wired/wireless communication and network infrastructures, a service interface technique, a security technique, or the like. Therefore, in recent years, a technique including a sensor network for connecting objects, Machine to Machine (M2M) communication, Machine Type Communication (MTC), or the like have been studied. In the IoT environment, intelligent Internet Technology (IT) services may be provided to collect and analyze data obtained from connected objects to create new value in human life. As existing Information Technology (IT) techniques and various industries converge and combine with each other, the IoT may be applied to various fields, such as smart homes, smart buildings, smart cities, smart cars or connected cars, smart grids, health care, smart home appliances, high-quality medical services, etc.

Accordingly, various attempts are being made to apply 5G communication systems to the IoT network. For example, techniques related to sensor networks, M2M communication, MTC, etc., are being implemented using a 5G communication technique including beam-forming, Multiple-Input and Multiple-Output (MIMO), array antennas, etc. The application of cloud-Radio Access Network (RAN) as a big data processing technique described above may be an example of convergence of the 5G communication technique and the IoT technique.

In mobile communication systems, carrier aggregation (CA) can aggregate multiple carriers into one wider frequency spectrum. Due to the wider frequency spectrum, CA can accelerate the transmission speed and reduce the delay.

However, in existing CA technologies, there is a problem that the services to be processed by each component carrier (CC) do not match the actual processing ability, resulting in low efficiency of service data transmission.

SUMMARY

Embodiments of the disclosure provide a carrier management method, a resource allocation method and related devices.

According to an example embodiment, a carrier management method is provided, the method comprising: receiving an access request from a target user equipment (UE); and determining, from candidate component carriers (CCs), a primary cell (Pcell) of the target UE based on the per-resource block (RB) throughput corresponding to each candidate CC.

According to an example embodiment, a resource allocation method is provided, the method comprising: acquiring at least one candidate allocation strategy for allocating service data to be allocated to at least one candidate component carrier (CC);

- determining throughput information and transmission delay related information corresponding to the at least one candidate allocation strategy; determining a target allocation strategy based on the throughput information and the transmission delay related information; and
- allocating the service data to be allocated based on the target allocation strategy.

According to an example embodiment, a carrier management apparatus is provided, the apparatus comprising:

- a receiving module comprising receiving circuitry configured to receive an access request from a target user equipment (UE); and
- a determination module comprising circuitry configured to determine, from candidate component carriers (CCs), a primary cell (Pcell) of the target UE based on the per-resource block (RB) throughput corresponding to each candidate CC.

According to an example embodiment, a resource allocation apparatus is provided, the apparatus comprising:

- an acquisition module comprising circuitry configured to acquire at least one candidate allocation strategy for allocating service data to be allocated to at least one candidate component carrier (CC);
- an effect determination module comprising circuitry configured to determine throughput information and transmission delay related information corresponding to the at least one candidate allocation strategy;
- a strategy determination module comprising circuitry configured to determine a target allocation strategy based on the throughput information and the transmission delay related information; and
- an allocation module comprising circuitry configured to allocate the service data to be allocated based on the target allocation strategy.

According to an example embodiment, an electronic device is provided, the device comprising:

- one or more processors;
- a memory; and
- one or more application programs, wherein the one or more application programs are stored in the memory and configured to be executed by the one or more processors, and the one or more programs are configured to execute the operations corresponding to the method described in the above methods.

According to an example embodiment, a non-transitory computer-readable storage medium is provided, wherein the storage medium has stored thereon at least one instruction, at least one program, a code set or an instruction set that, when loaded and executed by a processor, implement the methods described above.

In the carrier management method provided by various example embodiments of the present disclosure, when an access request from a target UE is received, a Pcell of the target UE is determined from candidate CCs based on the per-RB throughput corresponding to each candidate CC. Compared with selecting a Pcell for a UE by only considering RSRP values of CCs in the prior art, in the present disclosure, a Pcell is selected for a UE on the account of the per-RB throughput corresponding to candidate CCs, wherein the throughput represents the data transmission ability. In accordance with the implementations of the present disclosure, it is advantageous to prevent/reduce too many UEs from selecting a same CC as a Pcell, e.g., realizing the discrete selection of the Pcell, reduce the risk of Pcell blockage, improve the data transmission efficiency and reduce the time delay.

In the resource allocation method provided by various example embodiments of the present disclosure, after at least one candidate allocation strategy for allocating the service data to be allocated to at least one candidate CC, throughput information and transmission delay related information corresponding to each candidate allocation strategy can be determined, a target allocation strategy is then determined from the at least one candidate allocation strategy based on the throughput information and the transmission delay related information, and the service data to be allocated is allocated based on the target allocation strategy. In the implementations of the present disclosure, the throughput information and the transmission delay related information are taken into consideration during the allocation of the service data to be allocated to at least one candidate CC, so that it is advantageous to improve the transmission efficiency of service data.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
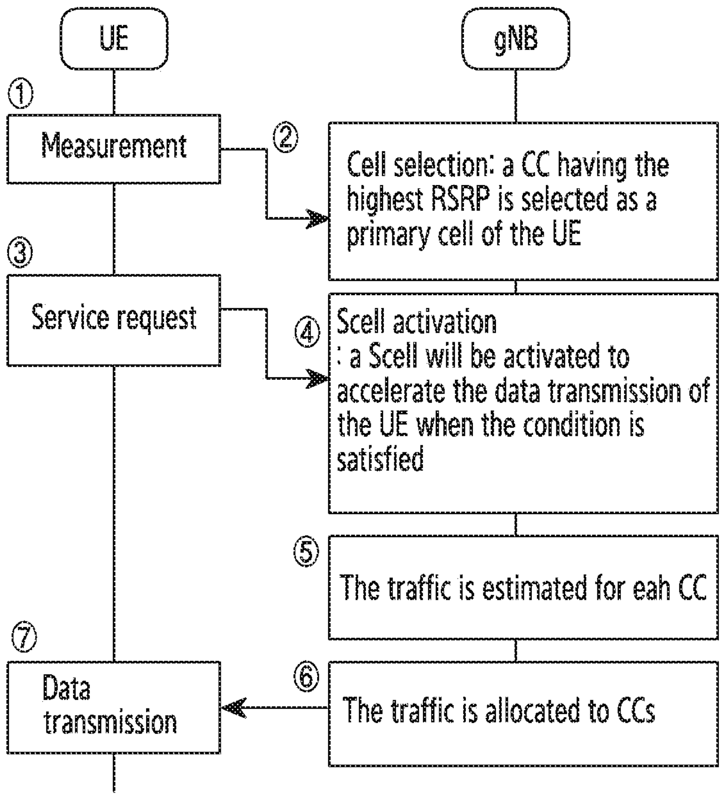
FIG. 1 is a flowchart illustrating an example carrier aggregation (CA) technology according to the related art.

The various example embodiments of the present disclosure are described in greater detail below, and the examples of the embodiments are illustrated in the drawings, where throughout the drawings, the same or similar reference numbers are used to depict the same or similar elements or elements having the same or similar functions. The embodiments described below with reference to the accompanying drawings are illustrative, and are merely used to explain the present disclosure, rather than being understood as limiting the present disclosure.

Those skilled in the art should understand that the singular forms “a”, “an”, “said” and “the” include plural referents unless the context clearly dictates otherwise. It should be further understood that the expression “comprising” or “include” used in the present disclosure may refer, for example, to the existence of the features, integers, steps, operations, elements and/or components, but does not preclude the existence or addition of one or more other features, integers, steps, operations, elements, components and/or combinations thereof. It should be understood when an element is referred to as being “connected to” or “coupled to” another element, it may be directly connected or coupled to the other element, or an intervening element may be present. Furthermore, the terms “connected” or “coupled” used herein may include a wireless connection or a wireless coupling. The phrase “and/or” used herein includes all or any one and all combinations of one or more of the associated listed items.

In CA, each carrier participating in CA may be referred to as a component carrier (CC). The primary cell (Pcell) may refer a carrier used to carry signaling and manage other carriers, and the secondary cell (Scell) may be used to expand bandwidth and enhance rate. The time when a Scell is added and deleted can be determined by the Pcell. In terms of UE, for different UEs, operating Pcells and Scells may be different, and multiple carriers participating in aggregation are not limited to being from a same base station and may be from adjacent base stations.

CA is a popular technology in the enhanced mobile broadband (eMBB). Operators require CA to enhance coverage while ensuring high throughput. Various frequency bands of 5G provide more component carriers (CCs). However, in the current CA technology, inflexible CC selection will lead to a sharp drop in the transmission rate of UEs, and UEs will bear long traffic delay and low throughput.

The CA technology will be described in greater detail below with reference to FIG. 1.

Step ①: measurement: the UE periodically measures the reference signal received power (RSRP) received by the UE on each CC of all gNBs and reports it to gNBs accessed by the UE in an idle state (the base station in 5G is referred to as a gNB in 3GPP).

Step ②: cell selection: the CC having the highest RSRP is selected as a Pcell of the UE. The Pcell can transmit the service data of the UE like other Scells, but the Pcell is also responsible for transmitting the control signaling of the UE.

Step ③: service request: when the UE needs to transmit a service, the UE initiates a service request to the gNB.

Step ④: Scell activation: when the following condition is satisfied, a Scell will be activated to accelerate the data transmission of the UE. When the service request from the UE is higher than a certain threshold, the wireless channel condition is better than a certain threshold, and the UE support the CA function.

Step ⑤: traffic estimation: based on the historical throughput data of CCs, the traffic estimated value of each CC in CA is calculated. The function in the step ⑤ is to calculate the amount of traffic expected to be allocated to each CC.

Step ⑥: allocation of the traffic to CCs: the corresponding traffic is allocated to each CC successively. The function in the step ⑥ is to determine the amount of traffic allocated to each CC. The input data is the amount of traffic expected to be allocated to each CC calculated in the step ⑤.

Step ⑦: data transmission is performed according to the service request from the UE.

In view of the situation that the UE has long time delay and extremely low throughput in the CA technology, it was found that there is a cause for this problem in the step ②, as set forth in greater detail below.

The nature of radio wave propagation causes the low-frequency radio wave to have less energy loss than the high-frequency radio wave. Therefore, low frequency band CCs have higher RSRP than high frequency band CCs. Thus, it results in a situation where most UEs select low frequency band CCs. That is, in the CA technology, when the UE accesses to select Pcell, the RSRP values of CCs are usually used as a selection criterion. However, a single selection criterion is likely to result in relatively centralized selection results. The low frequency band CCs usually have a narrow bandwidth, and the barrow bandwidth of CCs can allow only a limited number of UEs to simultaneously obtain high transmission rate in this frequency band. On this basis, when too many UEs select the same cell as the Pcell, the Pcell will be blocked, and there will be few opportunities for scheduling UEs that access this Pcell, so that the throughput of UEs is low. The low throughput of UEs will lead to a long time delay, and it will take a long time to complete the traffic requests from UEs.

In view of the foregoing, the disclosure provides a carrier management method. In this example method, after an access request from a target UE is received, a Pcell of the target UE is determined from candidate CCs based on the per-RB throughput corresponding to each candidate CC. In the implementations of this solution, it is advantageous prevent/reduce too many UEs from selecting a same CC as a Pcell, improve the data transmission efficiency, improve the throughput and reduce the time delay.

The present disclosure addresses the above technical problems as set forth in the various example embodiments herein. The following example embodiments can be combined with each other, and the same or similar concepts or processes may not be repeated in some embodiments. The embodiments of the present disclosure will be described below with reference to the accompanying drawings.

The various example embodiments of the present disclosure can be applied to various systems, for example, 5G systems. For example, the applicable systems may be global system of mobile communication (GSM) systems, code division multiple access (CDMA) systems, wideband code division multiple access (WCDMA) general packet radio service (GPRS) systems, long term evolution (LTE) systems, LTE frequency division duplex (FDD) systems, LTE time division duplex (TDD) systems, long term evolution advanced (LTE-A) systems, universal mobile telecommunication systems (UMTSs), worldwide interoperability for microwave access (WiMAX) systems, 5G new radio (NR) systems, etc. These systems may include UEs and network devices. The systems may further include core network portions, for example, evolved packet systems (EPSs), 5G systems (5GSs), etc.

Figure 2:
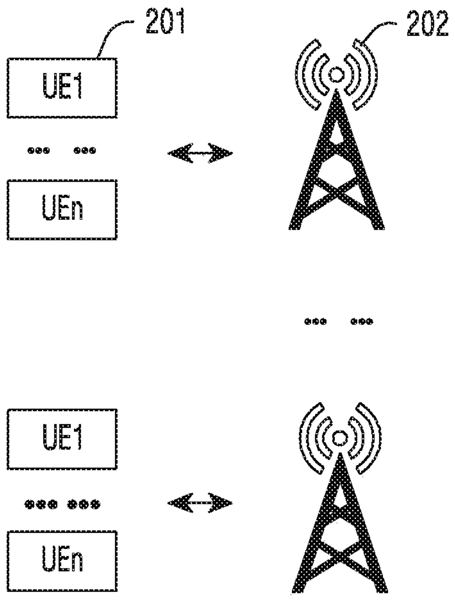
FIG. 2 is a diagram illustrating an example application environment of a carrier management method according to various embodiments.

FIG. 2 is a diagram illustrating an example of an application environment according to various embodiments. As shown in FIG. 2, the environment may include: a plurality of UEs 201 and a plurality of network devices 202.

The UEs 201 can communicate with one or more core networks through a radio access network (RAN). The UEs may be devices that provide users with voice and/or data connectivity, handheld devices having a wireless connection function, other processing devices connected to a wireless modem, etc. In different systems, the UE may be named differently. For example, in 5G systems, the UE may be referred to as a wireless UE. The wireless UE can communicate with one or more core networks (CNs) through a radio access network (RAN). The wireless UE may be a mobile UE, for example, a mobile phone (also referred to as a "cellular" phone) or a computer with a mobile UE. For example, the wireless UE may be portable, pocket-sized, handheld, computer built-in or vehicle-mounted mobile devices which exchange language and/or data with the RAN. For example, it may be a personal communication service (PCS) phone, a cordless phone, a session initiated protocol (SIP) phone, a wireless local loop (WLL) station, a personal digital assistant (PDA) or other devices. The wireless UE may also be referred to as a system, a subscriber unit, a subscriber station, a mobile station, a mobile, a remote station, an access point, a remote terminal, an access terminal, a user terminal, a user agent or a user device. This will not be limited in the embodiments of the present disclosure.

The network devices 202 may include base stations which may include one or more cells serving the terminals. According to different specific application scenarios, the base station may also be referred to as an access point, or may be a device that communicates with a wireless UE through one or more sectors on an air interface in the access network or be named otherwise. The network device may be used to interchange received air frames and internet protocol (IP) packets to serve as routers between the wireless UE and the remaining part of the access network, wherein the remaining part of the access network may include IP communication networks. The network device can also coordinate the attribute management of the air interface. For example, the network device involved in the embodiment of the present disclosure may be network devices (base transceiver stations (BTSs)) in the global system for mobile communications (GSM) or code division multiple access (CDMA), network devices (NodeB) in the wide-band code division multiple access (WCDMA), evolved network devices (evolutional Node B, eNB or e-NodeB) in the long term evolution (LTE) system or 5G base stations (gNB) in the 5G network architecture (next generation system), or may be home evolved node B (HeNB), relay nodes, femto, pico or the like. This will not be limited in the present disclosure. In some network structures, the network device may include centralized unit (CU) nodes and distributed unit (DU) nodes, and the centralized units and the distributed units may be geographically separated from each other.

The network devices 202 and the UEs 201 may each use at least one antenna for transmission or multiple antennas for multi-input multi-output (MIMO) transmission. The MIMO transmission may be single user MIMO (SU-MIMO) or multiple user MIMO (MU-MIMO). According to the form and number of antenna combinations, the MIMO transmission may be 2D-MIMO, 3D-MIO, FD-MIMO or massive-MIMO, or may be diversity transmission, recoding transmission, beamforming transmission or the like.

For example, as illustrated in FIG. 2, the carrier management method provided by the present disclosure can be applied in the following scenario: upon receiving an access request from a UE, a gNB determines a Pcell of the UE from candidate CCs based on the per-RB throughput corresponding to each candidate CC.

The above description merely illustrates an application example of the carrier management method of the present disclosure, and is not intended to limit the specific application scenarios of the carrier management method of the present disclosure.

Figure 3:
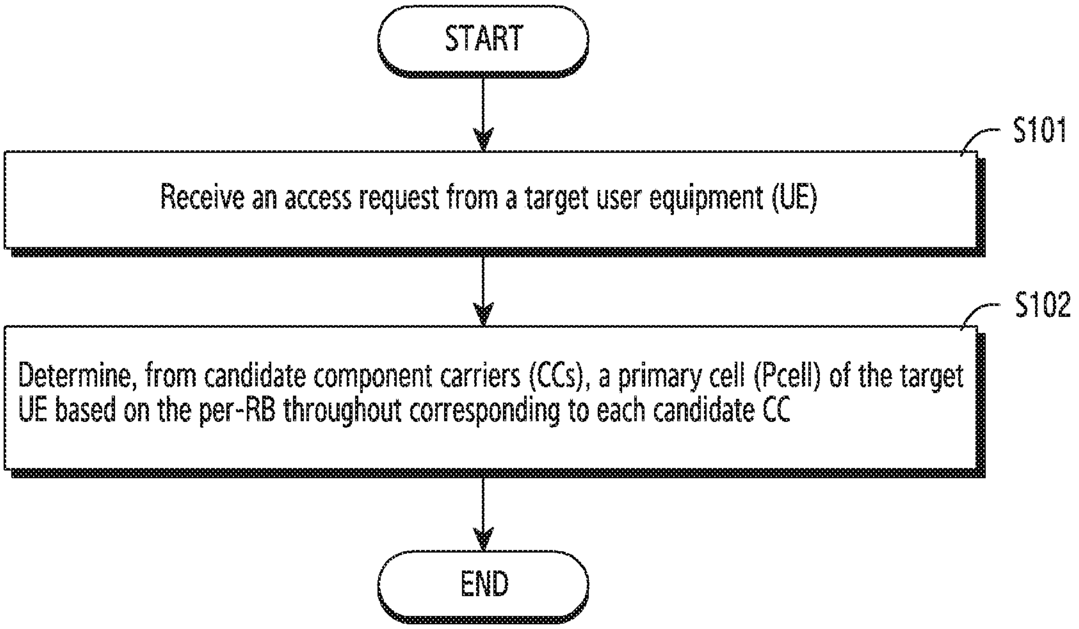
FIG. 3 is a flowchart illustrating an example carrier management method according to various embodiments.

An embodiment of the present disclosure provides a possible implementation. As shown in FIG. 3, a flowchart illustrating an example carrier management method according to various embodiments is provided, which can be applied in the network device 202 shown in FIG. 2 (that is, the network device 202 may be an executive body). The following embodiments will be described by taking the network device 202 as a gNB. For example, the carrier management method may comprise the following operations S101 to S102.

S101: An access request from a target user equipment (UE) is received.

S102: A primary cell (Pcell) of the target UE is determined from candidate component carriers (CCs) based on the per-resource block (RB) throughput corresponding to each candidate CC.

Figure 4:
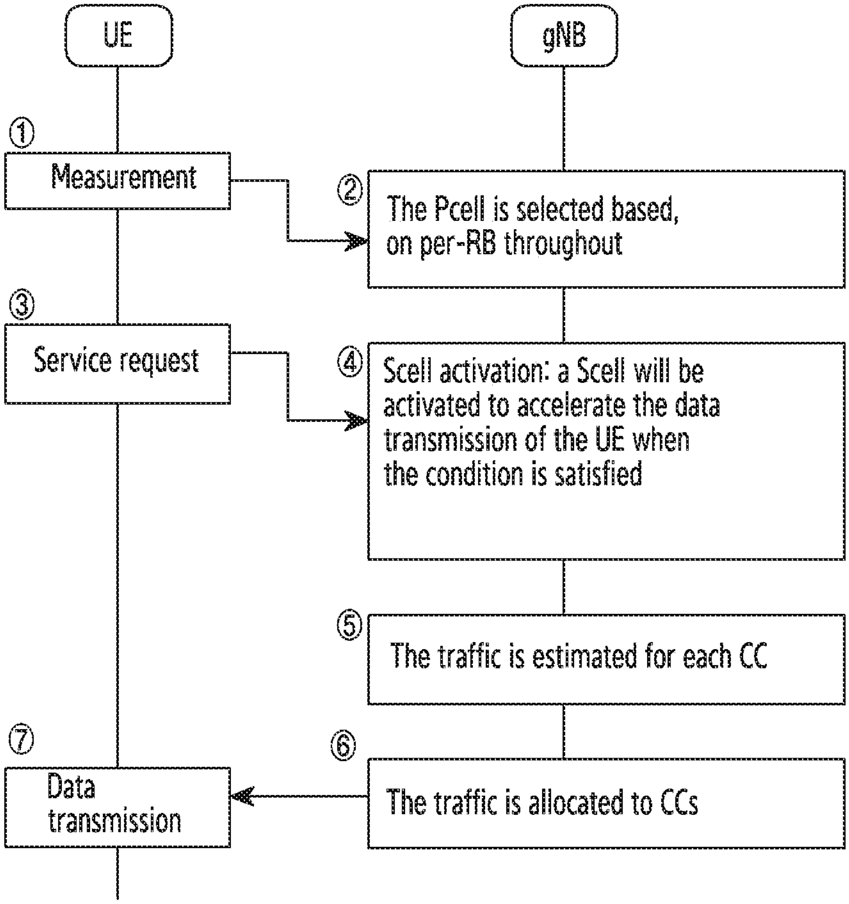
FIG. 4 is a flowchart illustrating an example carrier aggregation (CA) technology according to various embodiments.

For example, with reference to FIG. 4, in the present disclosure, the step ② in the CA technology is optimized. For the step 0, in the embodiments of the present disclosure, the idea of selecting a primary C based on the per-RB throughput (Per-RB Tput) includes: different CCs are selected as Pcells based on the historical per-RB throughput, preventing/reducing too many UEs form selecting a same CC as a Pcell.

When the target UE requests to data transmission with a base station, the target UE needs to access the base station, and corresponding carriers are allocated to the UE by the base station for data transmission. The base station allocates a Pcell to the UE according to the per-RB throughput corresponding to each candidate CC in the historical data. The candidate CCs may be CCs corresponding to the frequency band of the target UE among CCs preconfigured by the base station. The per-RB throughput represents the data transmission ability per RB, and RBs are radio resource units allocated by the base station gNB.

In an embodiment, the S102 of determining, from candidate CCs, a Pcell of the target UE based on the per-RB throughput corresponding to each candidate CC comprises the following operations A1-A2.

Step A1: The maximum value of the per-RB throughput within each reference signal received power (RSRP) range corresponding to each candidate CC is acquired.

Step A2: A Pcell of the target UE is determined from candidate CCs based on the maximum value of the per-RB throughput.

For example, the maximum value of the per-RB throughput (maximum Per-RB Tput value) reflects the transmission ability per RB of the corresponding CC. The Tput value represents the data transmission ability per RB. Therefore, the maximum Per-RB Tput reflects the normalized transmission ability of one CC of the gNB (the transmission ability per RB. The gNB can record the maximum Per-RB Tput, so the normalized transmission ability of each CC is known. The maximum Per-RB Tput is used as the reference for Pcell selection.

Optionally, the maximum value of the per-RB throughput can be acquired directly within each RSRP range corresponding to each candidate, and a candidate CC corresponding to the largest one of at least one maximum value of the per-RB throughput is then selected as the Pcell of the target UE.

Since the CCs corresponding to each target UE are difference in frequency band, candidate CCs corresponding to the RSRP value and the maximum value of the per-RB throughput within the corresponding RSRP range can be firstly determined based on the RSRP value reported to the base station by the target UE, and a candidate CC corresponding to the maximum value of the per-RB throughput is then selected from the corresponding candidate CCs to serve as the Pcell of the target UE.

In an embodiment, the step A1 of acquiring the maximum value of the per-RB throughput within each reference signal received power (RSRP) range corresponding to each candidate CC comprises a step B1.

Step B1: The maximum value of the per-RB throughput within each RSRP range corresponding to each candidate CC is acquired from a historical correspondence among each candidate CC, each RSRP range and the maximum value of the per-RB throughput, wherein the historical correspondence is determined based on the RSRP reported by an existing UE in each candidate CC and the per-RB throughput determined during data transmission.

For example, in initial construction, the historical correspondence among candidate CCs, RSRP range values and the maximum value of the per-RB throughput can be determined using the RSRP value reported by the existing UE in each candidate CC and the per-RB throughput determined during data transmission, which are obtained using a CC having the highest RSRP value as the Pcell of the UE in the related art. In the application process of the historical correspondence, the historical correspondence is updated in real time.

For example, after the Pcell of the UE is selected by the carrier management method provided by the present disclosure, the historical correspondence will be updated once in real time every time the UE completes data transmission with the base station.

In an embodiment, the determining the historical correspondence based on the RSRP value reported by an existing UE in each candidate CC and the per-RB throughput determined during data transmission comprises steps C1-C3.

Step C1: The corresponding per-RB throughput is determined based on data transmission information of the existing UE in the candidate CC.

In this example, the historical correspondence can be initialized based on each candidate CC and the preset RSRP range corresponding to each candidate CC.

Optionally, the initialized historical correspondence can be recorded in form of the following table 1.

TABLE 1

| CC No. | RSRP range | Maximum Per-RB Tput |
|---|---|---|
| CC(1) | RSRP(1)-RSRP(2) | |
| | RSRP(2)-RSRP(3) | |

TABLE 1-continued

| CC No. | RSRP range | Maximum Per-RB Tput |
|---|---|---|
| | . . . | |
| | RSRP(N-1)-RSRP(N) | |
| . . . | . . . | |
| CC(M) | RSRP(1)-RSRP(2) | |
| | RSRP(2)-RSRP(3) | |
| | . . . | |
| | RSRP(N-1)-RSRP(N) | |

It should be understood that the maximum value of the per-RB throughput in the initialized historical correspondence is null. The M is the total number of CCs preconfigured in the base station, and the RSRP range is a frequency band range predefined by the base station. Due to the difference in the radio propagation characteristics of different frequency bands, the RSRP ranges for CCs in different frequency bands are different.

Optionally, the number of preset RSRP ranges corresponding to each candidate CC is the same as the number of modulation and coding scheme (MCS) levels. The minimum RSRP value corresponding to each MCS level is the minimum RSRP value within an RSRP range corresponding to the corresponding candidate CC, and the maximum RSRP value corresponding to each MCS level is the maximum RSRP value within an RSRP range corresponding to the corresponding candidate CC.

For example, the number of RSRP ranges corresponding to any one candidate CC may be consistent with the number of MCS levels. MCS is the modulation and coding of data transmission. The higher the MCS level used by data transmission, the higher the data transmission rate is. The number of MCS levels is fixed, and the base station knows this information. It should be understood that the base station also knows the frequency band where each candidate CC is located.

Optionally, the numerical value of RSRP ranges corresponding to candidate CCs can be set as the number of MCS levels. For example, the minimum RSRP value and maximum RSRP value corresponding to each MCS level are set as the minimum RSRP value and maximum RSRP value of an RSRP range corresponding to this CC. For difference candidate CCs, the minimum RSRP value and maximum RSRP value of the RSRP range for each candidate CC may be different from those for other candidate CCs. It depends on whether there is a difference in frequency band between candidate CCs.

Optionally, in the above table 1, RSRP(1) and RSRP(2) correspond to the minimum RSRP value and maximum RSRP value of the highest MCS level; RSRP(3) and RSRP (4) correspond to the minimum RSRP value and maximum RSRP value of the second highest MCS level; by that analogy, RSRP(N-1) and RSRP(N) correspond to the minimum RSRP value and maximum RSRP value of the lowest MCS level.

Step C2: A corresponding RSRP range is determined based on the RSRP value reported by the existing UE in the candidate CC.

Step C3: The maximum value of the per-RB throughput corresponding to the candidate CC and the determined RSRP range is updated based on the per-RB throughput of the existing UE.

For example, after the historical correspondence is initialized, for example, after the historical look-up table (table 1) is established, the base station can adopt a Pcell selection method in the related art, e.g., using a CC corresponding to the maximum RSRP measurement value as the Pcell of the UE. The UE can start data transmission after the Pcell is selected. After each data transmission with the UE, the base station calculates the Per-RB Tput and updates the historical correspondence. The base station can record the maximum Per-RB Tput value corresponding to each table value in the historical look-up table by the above steps. It should be understood that the steps C1 to C3 will be executed every time the UE performs data transmission with the gNB.

In an embodiment, the step C1 of determining the corresponding per-RB throughput based on data transmission information of the existing UE in the candidate CC comprises a step D1.

Step D1: Every time the existing UE in the candidate CC completes a data transmission, the per-RB throughput of the UE during the present data transmission is calculated based on the number of RBs scheduled by the present data transmission, the transmission block size (TBS) and the duration of one transmission time interval (TTI).

For example, the Per-RB Tput value of each UE is determined by the number of RBs used by scheduling and the transmission block size (TBS). The TBS is calculated by the base station before determining how many RBSs are to be allocated to the UE. The value of TBS is approximately equal to the amount of data to be transmitted by the UE. The base station estimates the amount of data to be transmitted (e.g., TBS) using the number of RBs to be allocated and the MCS level allocated to the UE for transmission. The calculation of TBS is effective during one transmission opportunity. One transmission opportunity is generally considered to be equivalent to one transmission time interval (TTI). For different subcarrier interval configurations, the duration of one TTI is different. For any one CC, the subcarrier interval of the CC is a fixed value, so the duration of the TTI corresponding to each CC may be different. The information such as the subcarrier interval and the duration of the TTI belong to the configuration information of the gNB, so the base station knows the above information of each CC.

For example, the Per-RB Tput value of the UE in one TTI can be calculated by the following formula (1).

The Per-RB Tput value of the UE=the TBS of the UE/the number of RBs scheduled to the UE/the duration of one TTI     Formula (1)

In an embodiment, the step C3 of updating, based on the per-RB throughput of the existing UE, the maximum value of the per-RB throughput corresponding to the candidate CC and the determined RSRP range comprises a step D2.

Step D2: The maximum value of the per-RB throughput corresponding to the determined RSRP range is determined from the historical correspondence; and, if the per-RB throughput of the UE during the present data transmission is greater than the maximum value of the per-RB throughput corresponding to the determined RSRP range, the per-RB throughput corresponding to the determined RSRP range is updated as the per-RB throughput of the UE during the present data transmission.

For example, the existing UE in each candidate CC will report the measured RSRP value of each CC to the base station in real time. The base station can determine, according to the RSRP value, an RSRP range corresponding to the UE on the corresponding candidate CC. By comparing the measured RSRP value on the CC reported by the UE with the minimum value and maximum value of each RSRP range of the CC, the base station can determine the UE corresponds to which RSRP range of the CC. The base station compares the Per-RB Tput value calculated by the UE during the present transmission with the maximum Per-RB Tput value stored in the corresponding RSRP range in the historical look-up table. If the Per-RB Tput value of the UE is larger, the maximum Per-RB Tput value stored in the corresponding RSRP range is replaced with this value. That is, in the historical correspondence, each RSRP range for the CC only stores the maximum value of the per-RB throughput within each RSRP range.

The historical look-up table recorded with the maximum value of the per-RB throughput can be shown by the following table 2.

TABLE 2

| CC No. | RSRP range | Maximum (Per-RB Tput) |
|---|---|---|
| CC(1) | RSRP(1)-RSRP(2) | Per-RB $Tput_1(1)$ |
| | RSRP(2)-RSRP(3) | Per-RB $Tput_1(2)$ |
| | . . . | . . . |
| | RSRP(N-1)-RSRP(N) | Per-RB $Tput_1(N-1)$ |
| . . . | . . . | . . . |
| CC(M) | RSRP(1)-RSRP(2) | Per-RB $Tput_M(1)$ |
| | RSRP(2)-RSRP(3) | Per-RB $Tput_M$ (2) |
| | . . . | . . . |
| | RSRP(N-1)-RSRP(N) | Per-RB $Tput_M$ (N-1) |

For example, a CC corresponding to the maximum value of the per-RB throughput can be selected as the Pcell of the UE according to actual needs. The Pcell selection can also be considered according to actual needs and in combination with other parameters.

In an embodiment, the step B1 of acquiring, from a historical correspondence among each candidate CC, each RSRP range and the maximum value of the per-RB throughput, the maximum value of the per-RB throughput within each RSRP range corresponding to each candidate CC comprises a step E1.

Step E1: The maximum value of the per-RB throughput within each RSRP range corresponding to each candidate CC is acquired from a historical correspondence in an activated state, wherein, if the number of times when the difference of the maximum value of the per-RB throughput stored within each RSRP range in the historical correspondence before and after updating is less than a preset update threshold reaches a preset activation threshold, it is determined that the historical correspondence is in an activated state.

Optionally, in the process of establishing the historical correspondence, the historical correspondence is in a non-activated state before the variance of the maximum value of the per-RB throughput is less than a preset table threshold. For example, the variance of the maximum value of the per-RB throughput being greater than or equal to the preset table threshold is used as a measurement condition of enabling the historical correspondence for Pcell selection. In one feasible embodiment, the variance may also be replaced by standard deviation. This will not be limited in the embodiments of the present disclosure.

Optionally, in the process of updating the historical correspondence, upon receiving the RSRP value reported by the UE, the base station compares the maximum per-RB throughput A in the currently reported RSRP value with the maximum value B of the current per-RB throughput within the corresponding RSRP range of the corresponding CC in the historical look-up table. If A is greater than B, the per-RB throughput B is replaced with the per-RB throughput A; or otherwise, the historical look-up table is not updated. In one feasible embodiment, since the recorded numerical value of the maximum value of the per-RB throughput tends to be stable after the historical correspondence is updated for a period of time, the difference between the per-RB throughput A and the per-RB throughput B with a preset table threshold D; and, the historical look-up table is updated based on the per-RB throughput A when the difference C is greater than the threshold D.

Optionally, the condition for the base station enabling the historical correspondence for Pcell selection may also be that the base station sets a predefined threshold with a small value and a counter threshold. The base station sets a counter having an initial value of 0. If the change in the maximum Per-RB Tput value before and after updating does not exceed the threshold, the counter is incremented by 1. If the numerical value of the counter exceeds the threshold, the base station can enable the historical look-up table for Pcell selection.

Figure 5:
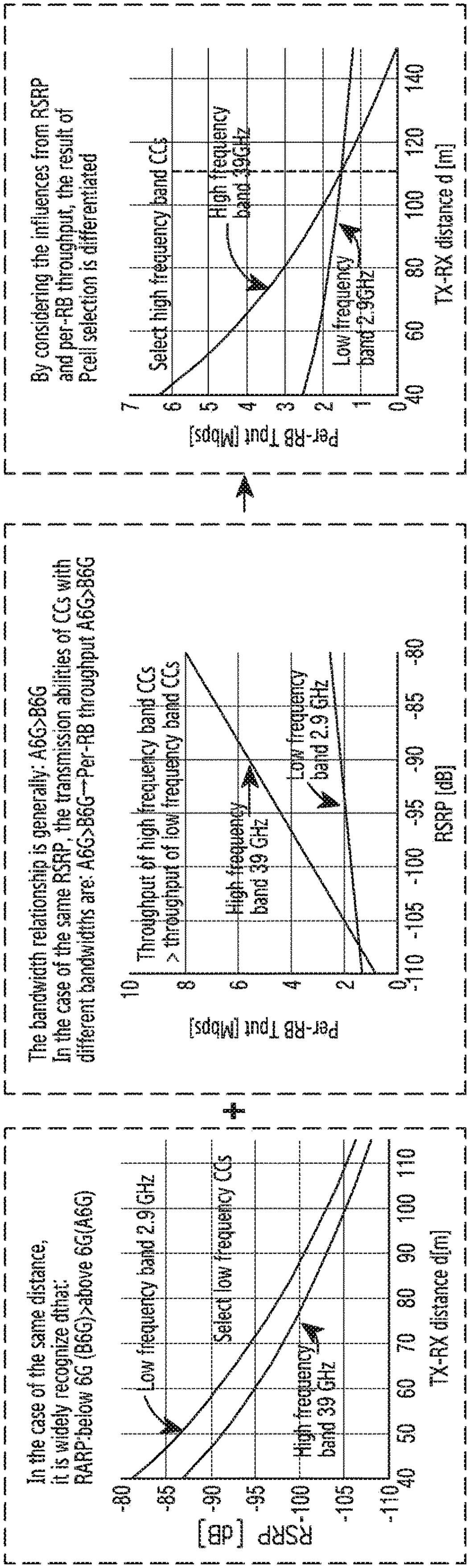
FIG. 5 is a diagram illustrating the relationship between the per-RB throughput during Pcell selection and an RSRP influence factor according to various embodiments.

During the Pcell section, more influence factors can be taken into consideration, so that the result of selection of the Pcell for the UE is discretized. Firstly, the relationship between the RSRP and the per-RB throughput under different frequencies and propagation distances can be taken into consideration. By considering the both, the simulated data is shown in FIG. 5, where A6G is higher than 6 GHZ, and B6G is lower than 6 GHz. For example, when only the RSRP is taken into consideration (in case of the same distance), the RSRP value of the A6G CC is less than the RSRP value of the B6G, and a low frequency band CC is selected as a Pcell. When only the per-RB throughput is taken into consideration (in case of the same RSRP), the per-RB throughput of the A6G CC is greater than the per-RB throughput of the B6G, a high frequency band CC is selected as a Pcell. When both the RSRP value and the per-RB throughput are taken into consideration, the per-RB throughput of the A6G CC (frequency band: 39 GHz) and the B6G (frequency ban: 2.9 GHZ) changes with the change of the distance to the transmitter-receiver (TX-RX), so that the final result of Pcell selection is differentiated.

It should be understood that the selection of a primary CC based on the Per-RB Tput may be mainly realized based on the historical correspondence (the historical look-up table described above) in the embodiments of the present disclosure. The RSRP values in the historical correspondence can be divided into multiple RSRP ranges (for example, multiple RSRP ranges are determined at fixed intervals (e.g., 3 dB). The existing UEs on all CCs report their RSRP values to the base station, and the base station updates and records the maximum value of the per-RB throughput in ranges to which the reported RSRP values belong. Further, the maximum per-RB throughput in the historical correspondence is searched and output to determine the selection of Pcell. Optionally, the historical correspondence is updated constantly.

In an embodiment, a multi-factor fusion method is further provided for Pcell selection. Specifically, the step A2 of determining, from candidate CCs, a Pcell of the UE based on the maximum value of the per-RB throughput comprises steps F1 to F3.

Step F1: Based on an RSRP value reported by the target UE, the maximum value of the per-RB throughput within an RSRP range corresponding to the RSRP value is determined from the historical correspondence.

It should be understood that, when a target UE requests access, in the step of UE measurement, the target UE can also report an RSRP value of each CC to the base station. Based on the RSRP value reported by the target UE, the maximum value of the per-RB throughput within an RSRP range corresponding to the RSRP value can be determined from the historical correspondence.

Step F2: Based on the resource utilization information of candidate CCs, the number of RBs of CCs and the maximum value of the per-RB throughput corresponding to the RSRP value reported by the target UE, candidate CCs are screened to obtain a candidate CC set including at least one candidate CC.

The resource utilization information may be the physical resource block (PRB) utilization rate.

For example, based on the resource utilization information of candidate CCs, the number of RBs of CCs and the maximum value of the per-RB throughput corresponding to the RSRP value reported by the target UE, screening candidate CCs to obtain a candidate CC set can be expressed by the following formula (2):

$$V_{select}(cc)=[1-P_u(cc)]\cdot N_{RB}(cc)\cdot PT_s(cc) \quad \text{Formula (2)}$$

Where the value $V_{select}(cc)$ is used to select, from all available CCs of the target UE, a candidate CC as the Pcell of the target UE; $P_u(cc)$ represents the PRB utilization rate of the $cc^{th}$ CC; $N_{RB}$ (cc) represents the number of PRBs of the $cc^{th}$ CC (also referred to as the number of RBs in different scenarios); cc represents the sequential number of the CC, and cc $\in$[1, M]; and, $PT_S(cc)$=Per–RB $Tput_{cc}(s)$, where s represents the RSRP reported by the target UE corresponding to the $i^{th}$ RSRP range.

Optionally, the division of options based on the PRB utilization rate can refer to the following table 3.

TABLE 3

| | Situation 1 | Situation 2 | Situation 3 |
|---|---|---|---|
| A6G CC (the utilization rate of PRBs > X %) | NO | YES/NO | YES |
| B6G CC (the utilization rate of PRBs > X %) | NO | NO/YES | YES |

It should be understood that X is a high load threshold and may be set as 60. As shown in FIG. 5, the A6G CC may correspond to a high frequency band CC, and the B6G CC may correspond to a low frequency band CC. In the situation 1, both the PRB utilization rate of the A6G CC and the PRB utilization rate of the B6G CC are less than or equal to X %, that is, both the A6G CC and the B6G CC are in a low load state at this time. In the situation 2, a state is included: the PRB utilization rate of the A6G CC is greater than X %, while the PRB utilization rate of the B6G CC is less than or equal to X % (the load on the A6G CC is greater than that on the B6G CC); and, another state may also be included: the PRB utilization rate of the A6G CC is less than or equal to X %, while the PRB utilization rate of the B6G CC is greater than X % (the load on the A6G CC is less than that on the B6G CC). That is, in the A6G CC and the B6G CC, a frequency band CC is in a high load state, while the other frequency band CC is in a low load state. In the situation 3, both the PRB utilization rate of the A6G CC and the PRB utilization rate of the B6G CC are greater than X %, that is, both the A6G CC and the B6G CC are in a high load state at this time.

For example, for the situations 1 and 2 shown in Table 3, the method provided by the present disclosure can be used to select the Pcell; while for the situation 3 shown in Table 3, the method provided by the present disclosure is not used to select the Pcell, and a low frequency band CC can be directly used as the Pcell.

Step F3: A Pcell of the target UE is determined from the candidate CC set.

For example, the candidate CC set calculated by the formula in the step F2 may include a plurality of candidate CCs. In this case, the candidate CC corresponding to the maximum Vselect(cc) value is used as the Pcell of the target UE.

Optionally, any CC can be randomly selected from the candidate CC set as the Pcell of the target UE, or the Pcell can also be selected based on the per-RB throughput and in combination with the historical correspondence. That is, the maximum value of the per-RB throughput corresponding to each candidate CC in the candidate CC set is inquired from the historical look-up table, and a candidate CC having the largest maximum value of the per-RB throughput is selected as the Pcell.

In an embodiment, a proportional random method is further provided for Pcell selection. In this embodiment, other factors for further discretizing the result of selection may include: the number of UEs, the mean data packet waiting time, the buffer size in the radio link control (RLC) layer/media access control (MAC) layer, etc. For example, the step A2 of determining, from candidate CCs, a Pcell of the target UE based on the maximum value of the per-RB throughput comprises steps G1 to G3.

Step G1: Candidate CCs corresponding to the RSRP value are determined from the historical correspondence based on the RSRP value reported by the target UE.

Figure 6:
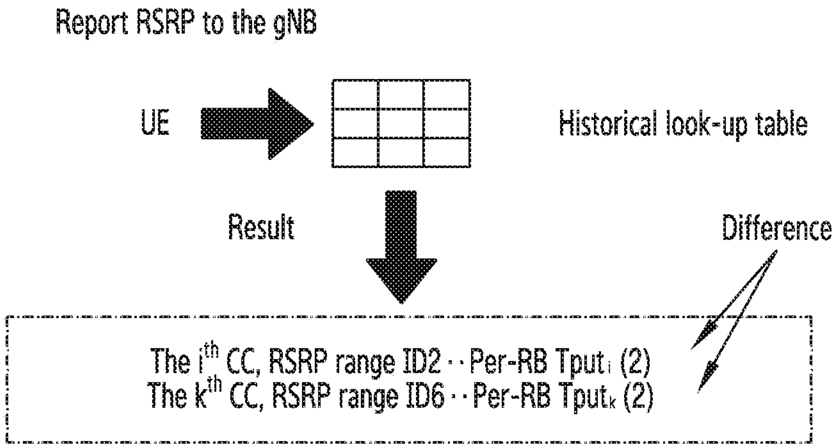
FIG. 6 is a diagram illustrating an example of acquiring the number of UEs accessed by each CC and the PRB utilization rate according to various embodiments.

As shown in FIG. 6, candidate CCs corresponding to each RSRP range corresponding to the RSRP value reported by the target UE can be determined from the historical correspondence based on the RSRP value reported by the target UE.

In an embodiment, as shown in FIG. 6, when the $i^{th}$ CC and the $k^{th}$ CC are screened in the step G1, by inquiring the historical look-up table, it is known that the per-RB throughput A in the $i^{th}$ CC within the current RSRP range is 2 and the per-RB throughput B in the $k^{th}$ CC is 6. Then, the difference between A and B is compared with a set threshold Thr_R, and the operations in subsequent steps will be executed when the difference between A and B is less than the set threshold Thr_R. Optionally, when a plurality of candidate CCs are screened in the step G1, the maximum per-RB throughput in all candidate CCs can be used as a reference and then compared with each per-RB throughput corresponding to other candidate CC one by one. When the difference between the both is less than the set threshold Thr_R, this other candidate CC is reserved in the result of the step G1; or otherwise, this other candidate CC is removed from the result of the step G1. In accordance with the above embodiment, too many UEs can be prevented/inhibited from selecting a same CC as the Pcell, the amount of calculation can be reduced, and the effectiveness of Pcell selection can be improved.

Figure 7:
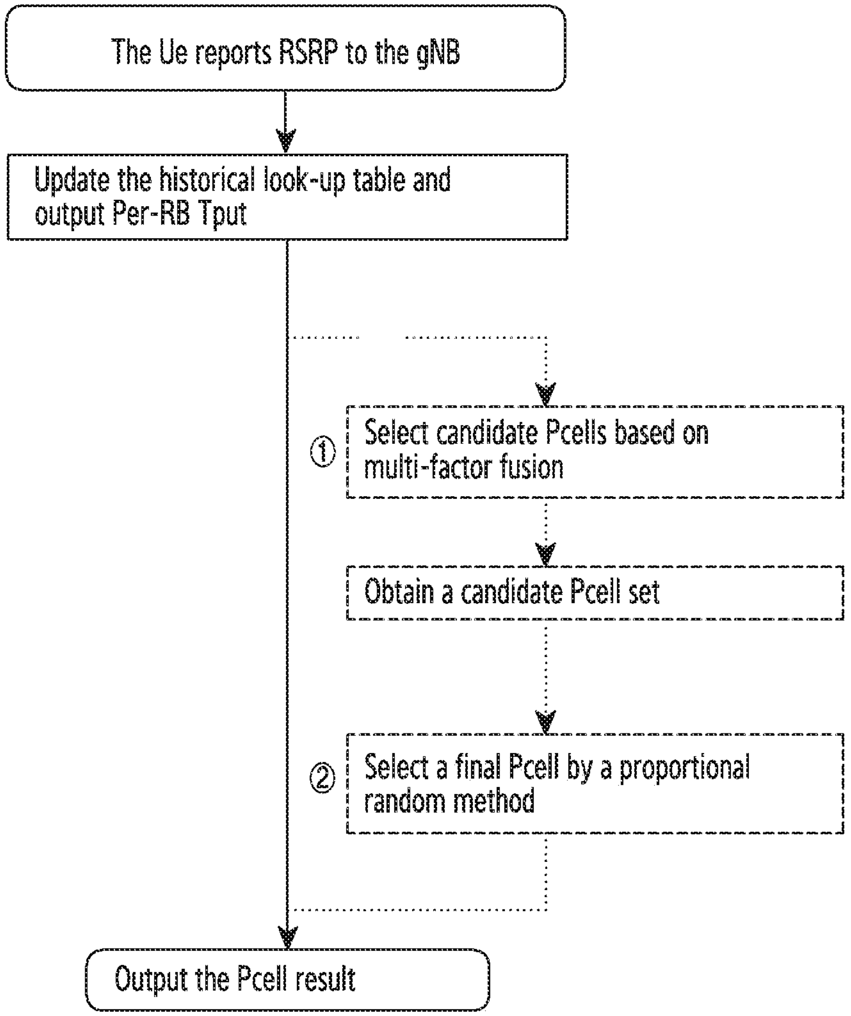
FIG. 7 is a flowchart illustrating an example of selecting a Pcell based on the per-RB throughput according to various embodiments.

In an embodiment, the proportional random method can also be executed in combination with the multi-factor fusion method. As shown in FIG. 7, when the candidate CC set is screened from candidate CCs using the $V_{select}(cc)$ value in the step F2, the candidate CC set can be used as the basic data for the execution of the step G1 or G2. Optionally, it is also possible that the candidate CCs in the candidate CC set are sorted in descending order based on the $V_{select}(cc)$ value and a preset number of CCs sorted ahead are acquired as the basic data for the execution of the step G1 or G2. It is also possible that corresponding CCs having a $V_{select}$(cc) value greater than the set threshold are used as the basic data for the execution of the step G1 or G2.

Step G2: For each candidate CC corresponding to the RSRP value reported by the target UE, a proportion value of the candidate CC is determined based on the number of UEs accessed by the candidate CC and resource utilization information.

After the candidate CCs corresponding to the RSRP value reported by the target UE are obtained by executing the step G1, a random selection probability value (proportion value) of randomly selecting each corresponding candidate CC as the Pcell in the proportional random method can be calculated.

For example, as shown in FIG. 6, when the $i^{h}$ CC and the $k^{th}$ CC screened in the above embodiment are candidate CCs corresponding to the RSRP reported by the target UE, processing can be performed for the two candidate CCs. Optionally, the number of accessed UEs and the PRB utilization rate corresponding to each candidate CC are acquired firstly, and the acquired parameters are then normalized. The situation after normalization can refer to the following table 4.

TABLE 4

| | The number of accessed UEs (after normalized) | PRB utilization rate (after normalized) |
|---|---|---|
| The $i^{th}$ CC | 1 | 0.2 |
| The $k^{th}$ CC | 0.7 | 1 |

The proportion of the number of accessed UEs of the $k^{th}$ CC after normalized is 0.7. That is, it is indicated that the number of currently accessed UEs is 70 when the maximum value of the number of UEs accessed by this CC is 100.

Optionally, the step G2 of determining a proportion value of the candidate CC based on the number of UEs accessed by the candidate CC and resource utilization information comprises steps G21 to G23.

Step G21: Based on a first weight corresponding to the number of accessed UEs and a second weight corresponding to the resource utilization information, a weighted sum of the candidate CC is determined.

Step G22: If the first weight is less than the second weight, the reciprocal of the weighted sum is used as the proportion value of the candidate CC.

Step G23: If the first weight is greater than the second weight, the weighted sum is used as the proportion value of the candidate CC.

The situation where the proportion value of the candidate CC is determined based on the first weight and the second weight can refer to the following table 5.

TABLE 5

| | Weighted sum | 1/weighted sum |
|---|---|---|
| The $i^{th}$ CC | (1*A + 0.2*B = 0.36) | 1/0.36 = 2.78 |
| The $k^{th}$ CC | (0.7*A + 1*B = 0.94) | 1/0.94 = 1.06 |

In Table 5, the first weight A for the number of accessed UEs is equal to 0.2, and the second weight B for the PRB utilization rate is equal to 0.8.

Optionally, in the embodiments of the present disclosure, the following setting is given: if the first weight for the number of accessed UEs is less than the second weight for the PRB utilization rate, the reciprocal of the weighted sum is used as the proportion value of the CC; and, if the first weight is greater than the second weight, the weighted sum is used as the proportion value of the CC. The proportion value and the weight are set to reflect the random selection of the Pcell.

Step G3: A Pcell of the target UE is determined from the candidate CCs corresponding to the RSRP value reported by the target UE based on the proportion value.

For example, with reference to the example shown in Table 5, the proportion of the base station selecting the $i^{th}$ CC as a Pcell for the target UE and the proportion of the base station selecting the $k^{th}$ CC as a Pcell for the target UE are 72.31% and 27.69%, respectively. For example, the probability of randomly selecting the $i^{th}$ CC as a Pcell is greater than the probability of randomly selecting the $k^{th}$ CC as a Pcell.

With reference to FIG. 7, the specific solution of optimizing the step ② in the existing CA technology according to the present disclosure will be further described.

As shown in FIG. 7, in the embodiments of the present disclosure, the primary CC Pcell is selected based on the historical look-up table and in combination with the multi-factor fusion and proportional random methods based on the tables.

Multi-factor fusion method (this method is optional, and may be combined with the proportional random method only on the basis of the historical correspondence): several appropriate candidate CCs are selected according to the Per-RB Tput, PRB utilization or the like to form a candidate CC set.

Proportional random method (this method is optional, and may be combined with the multi-factor fusion method only on the basis of the historical correspondence): the base station randomly selects one CC from candidate CCs for the target UE according to the conditions of CCs.

Figure 8:
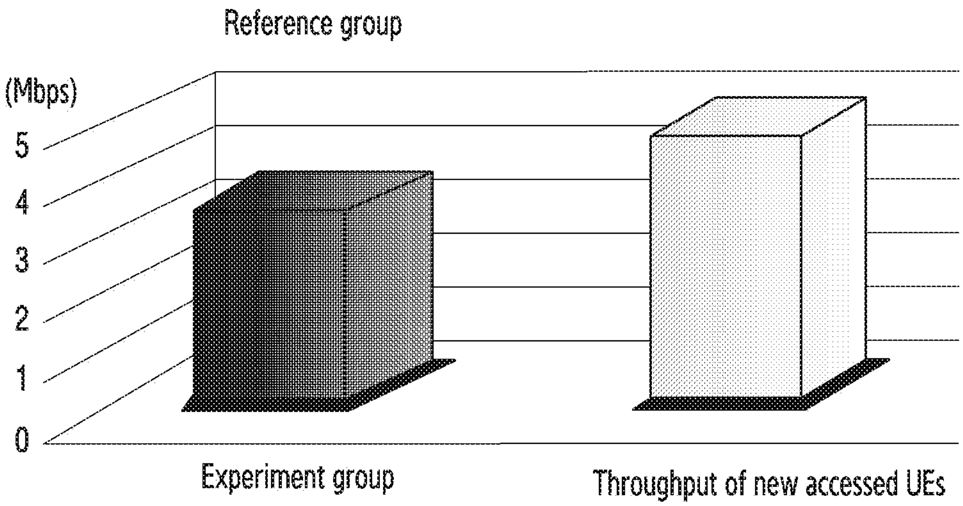
FIG. 8 is a comparison diagram of transmission efficiency according to various embodiments.

The method of selecting a Pcell based on the per-RB throughput in the embodiments of the present disclosure will be described below with reference to FIG. 8.

For the method of selecting a Pcell based on the per-RB throughput, it can be determined by experiment that the transmission rate can be improved by 34% by selecting a primary CC based on Per-RB Tput. The specific evaluation experiment will be configured and analyzed below.

A network including 70 users is set. 51 users select low frequency bands as primary CCs (with a bandwidth of 2.9 GHz and 40 MHz). On the other hand, 19 users select CCs with a bandwidth of 100 MHz (a frequency band of 39 GHz) as primary CCs. In addition, in an actual network, there are usually majority of users with a low packet traffic. Therefore, it is assumed that multi-CC transmission will not be enabled by the users' traffic.

When a new user accesses, Pcell selection is performed based on the prior art. Due to the high RSRP of −96.3 dB, the user will select a low frequency band CC as a primary CC. However, in the method of the present disclosure, since the Per-RB throughput in the frequency band of 39 GHz (the difference in throughput is 2 Mbps greater than 2.9 GHz), the user will select a high frequency band (RSRP: −99.6 dB) CC as a primary CC. The comparison of the effects achieved by the both is shown in FIG. 8.

In the present disclosure, the step ⑥ in the above CA technology is also improved. For example, the processing in the step ⑥ in the related art is difficult to avoid the problem that the data packet stays in a certain CC for a long time so that the UE needs to experience long service delay and low throughput. That is, the data newly allocated to a CC may have to wait for a long time, because the queue of this CC may contain more data to be processed.

In view of the technical problem in the step ⑥ in the above CA technology, the embodiments of the present disclosure consider that the service data to be allocated for the UE can be allocated to each CC based on the proportion of the expected data amount of each CC in the sum of the expected data amounts of all CCs. However, even if there is few service data allocated to some CCs, due to a large amount of service data to be processed in the queues of these CCs, the service data newly allocated to these CCs are difficult to be processed in a short time. Therefore, the UE may wait for a longer time, resulting in longer service processing delay and lower throughput.

Figure 9:
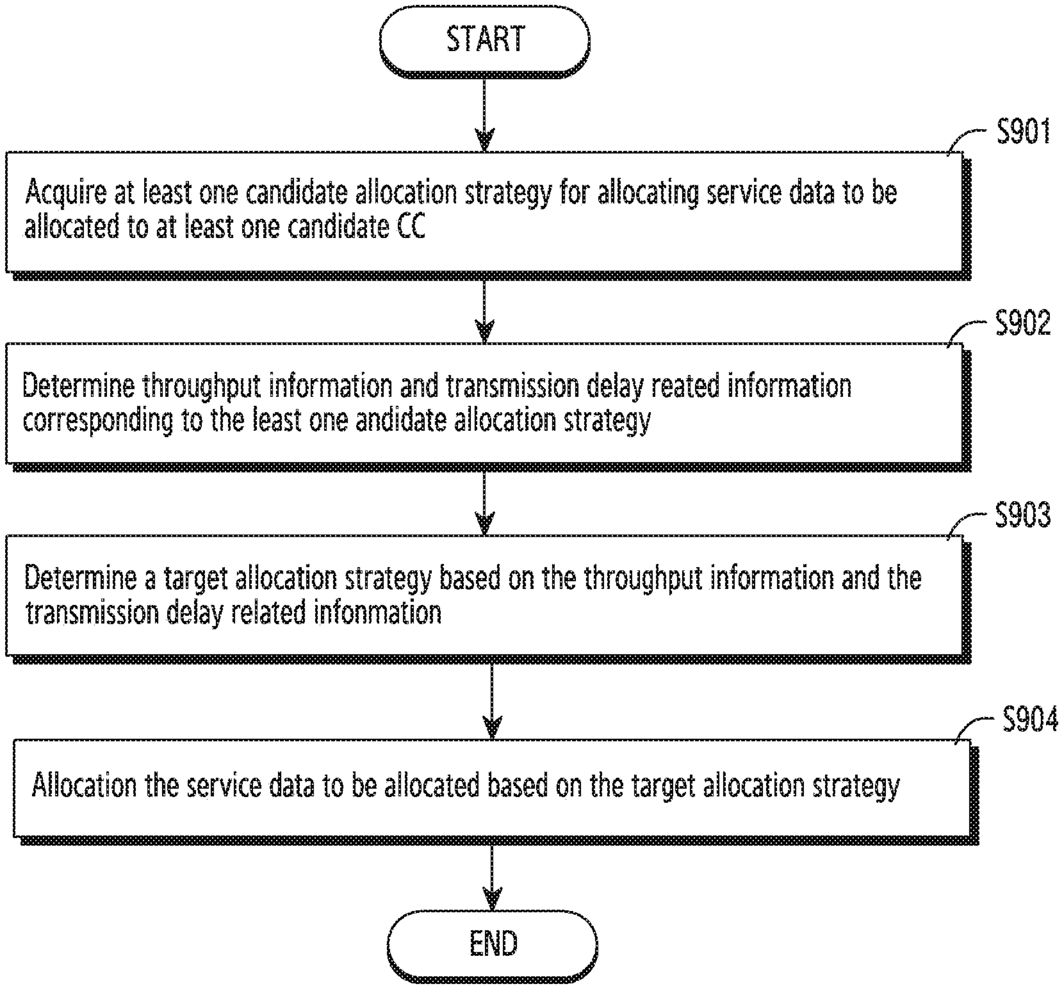
FIG. 9 is a flowchart illustrating an example resource allocation method according to various embodiments.
Figure 10:
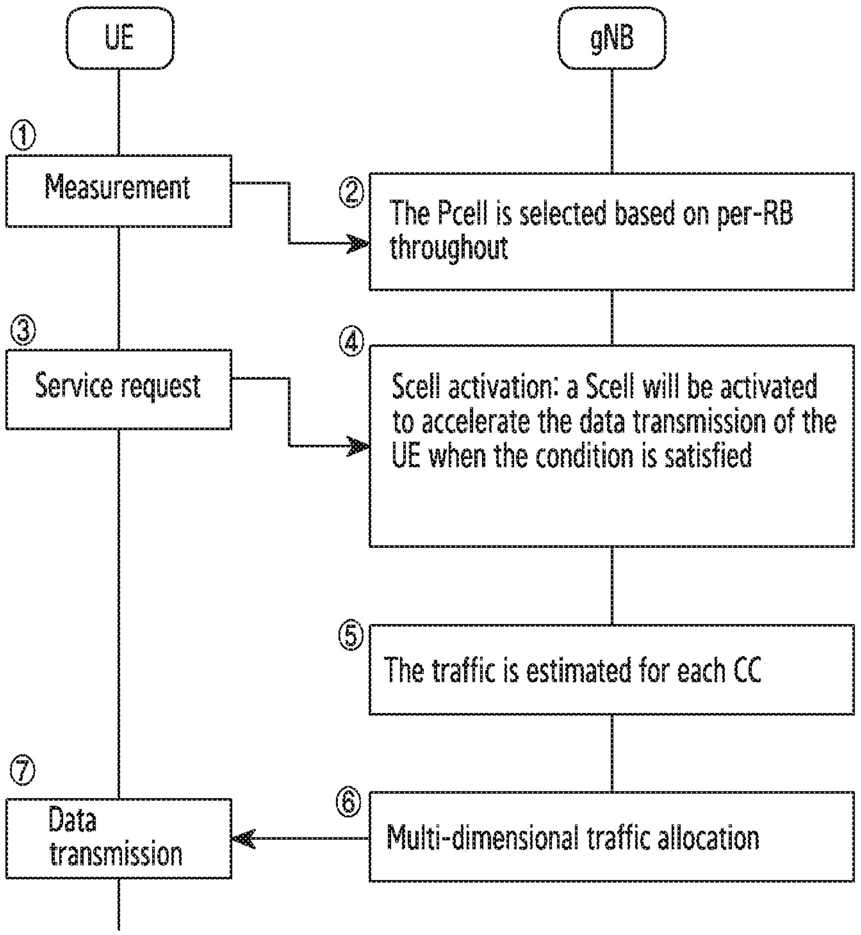
FIG. 10 is a flowchart illustrating an example CA technology according to various embodiments.

In view of the technical problem in the step ⑥ in the above CA technology, as shown in FIG. 10, an embodiment of the present disclosure provides a multi-dimensional traffic allocation scheme. For example, as shown in FIG. 9, a flowchart illustrating an example resource allocation method according to various embodiments is provided. It should be understood that the carrier management method and the resource allocation method provided by the embodiments of the present disclosure can be applied simultaneously. For example, after the Pcell is determined by the carrier management method, the service data to be allocated is allocated by the resource allocation method. In addition, the resource allocation method provided by the embodiments of the present disclosure can also be applied separately, without depending on the Pcell determined by the carrier management method. For example, it is possible that the service data to be allocated is allocated by the resource allocation method after the steps ① to ⑤ are executed based on the related art as shown in FIG. 1.

In the following embodiments, the process of allocating to CCs the service data requested to be allocated by a UE will be improved. Specifically, for the current service data to be allocated, at least one candidate allocation strategy for allocating the service data to be allocated to at least one candidate CC is acquired by a multi-dimensional service allocation method; by comprehensively considering the throughput of CCs and the time delay of the UE, a target allocation strategy for allocating the service data to at least one candidate CC is determined; and, the service data is allocated to CCs based on the target allocation strategy. In the implementations of this scheme, the situation where the UE's service data is waiting for processing in CCs can be alleviated, and the service delay of the UE is minimized while maximizing the throughput of the UE. This embodiment can be applied in the network device 202 shown in FIG. 2 (that is, the network device 202 may be an executive body). The following embodiments will be described by taking the network device 202 as a gNB. Specifically, the resource allocation method provided by the embodiment of the present disclosure may comprise the following steps S901 to S904.

S901: At least one candidate allocation strategy for allocating service data to be allocated to at least one candidate CC is acquired.

For example, the service data to be allocated may be service data requested to be processed by at least one UE (also referred to as target UE). The service data to be allocated may be service data to be transmitted in a service request initiated by a UE currently received by a base station. The candidate CCs corresponding to each UE may be different, that is, the candidate CCs during the allocation of the service data requested to be allocated by each UE may be different.

In an embodiment of the present disclosure, for each UE that initiates a service request, the service data to be allocated for each UE can be allocated to corresponding candidate CCs; and, there are a plurality of UEs that initiate a service request, the service data to be allocated for the plurality of UEs needs to be allocated to corresponding candidate CCs.

The allocation strategy may refer, for example, to a strategy for allocating all service data to be allocated to at least one candidate CC. For example, the service data to be allocated for N UEs will be allocated to M candidate CCs, a certain allocation strategy may be the amount of service data to be allocated to each candidate CC. For example, an allocation strategy may be allocating the service data to be allocated for all UEs to four candidate CCs. One candidate allocation strategy may be allocating averagely allocating ¼ of the service data to be allocated to each candidate CC, while another candidate allocation strategy may be allocating ½ of the service data to be allocated to the first candidate CC, averagely allocating ¼ of the service data to be allocated to the second candidate CC and the third candidate CC and not allocating the service data to be allocated to the fourth candidate CC. That is, there are many strategies for allocating the service data to be allocated to candidate CCs.

S902: Throughput information and transmission delay related information corresponding to the at least one candidate allocation strategy are determined.

Considering that there are many possible candidate allocation strategies, many allocation effects (e.g., the throughput of CCs, the service delay experienced by the UE, etc.) can be achieved correspondingly. That is, each candidate allocation strategy correspond to one allocation effect, and the allocation effect can be achieved based on the throughput information and transmission delay related information. How to determine the throughput information and transmission delay related information corresponding to each candidate allocation strategy will be described in detail in the following embodiments.

S903: A target allocation strategy is determined based on the throughput information and the transmission delay related information.

For example, as described in S902, the throughput information and the transmission delay related information are allocation effects corresponding to the allocation of the service data to be allocated based on candidate allocation strategies. In the embodiments of the present disclosure, a target allocation strategy is selected from at least one candidate allocation strategy using allocation effects as guidance. That is, in the embodiments of the present disclosure, during the allocation of the service data to be allocated, both the throughput information and the transmission delay related information are taken into consideration, and the final target allocation strategy is determined by balancing the throughput and the time delay.

S904: The service data to be allocated is allocated based on the target allocation strategy.

For example, the target allocation strategy is one of the at least one candidate allocation strategy. After the target allocation strategy is determined, it can be known that the service data to be allocated should be allocated to which candidate CCs and how much service data should be allocated to each candidate CC, so that the allocation of the service data to be allocated is completed. After the service data is allocated, the service data for the UE will be transmitted by a corresponding CC.

For example, various characteristics of the traffic should be taken into consideration during the traffic allocation in the carrier aggregation, but these characteristics are ignored by the traffic allocation methods in the related art. In the resource allocation method provided by the embodiment of the present disclosure, during the traffic allocation of the UE, multi-dimensional factors are taken into consideration (each candidate allocation strategy corresponding respective throughput information and transmission delay related information), and the throughput and the transmission delay can be balanced, so that the efficiency of service data transmission is improved.

Determining the throughput information corresponding to each candidate allocation strategy will be described in greater detail below.

In an embodiment, the throughput information comprises the total throughput of all candidate CCs. For example, when the throughput information corresponding to the at least one candidate allocation strategy is determined in S902, the following step S902-1 is specifically executed for each candidate allocation strategy.

Step S902-1: Based on the remaining service data corresponding to each candidate CC and the newly added service data corresponding to each candidate CC after the allocation of the service data to be allocated, the total throughput of all candidate CCs is determined.

The candidate CC refers to at least one CC covered by the base station, and can adapt to the correspondence with the UE and transmit the service data requested by the UE. Generally, the base station can cover multiple candidate CCs, but not any UE can correspond all candidate CCs covered by the base station. In addition, one UE can correspond to multiple candidate CCs, but not each candidate CC receives the allocated service data every time the UE initiates a service request. Based on the accumulation of historically allocated service data, there may still be service data that is not transmitted in each candidate CC before receiving the service data to be allocated currently. In this embodiment, the service data that is not transmitted is referred to as the remaining service data. The currently received service data to be allocated in each candidate CC is referred to as newly added service data in this embodiment.

Figure 15:
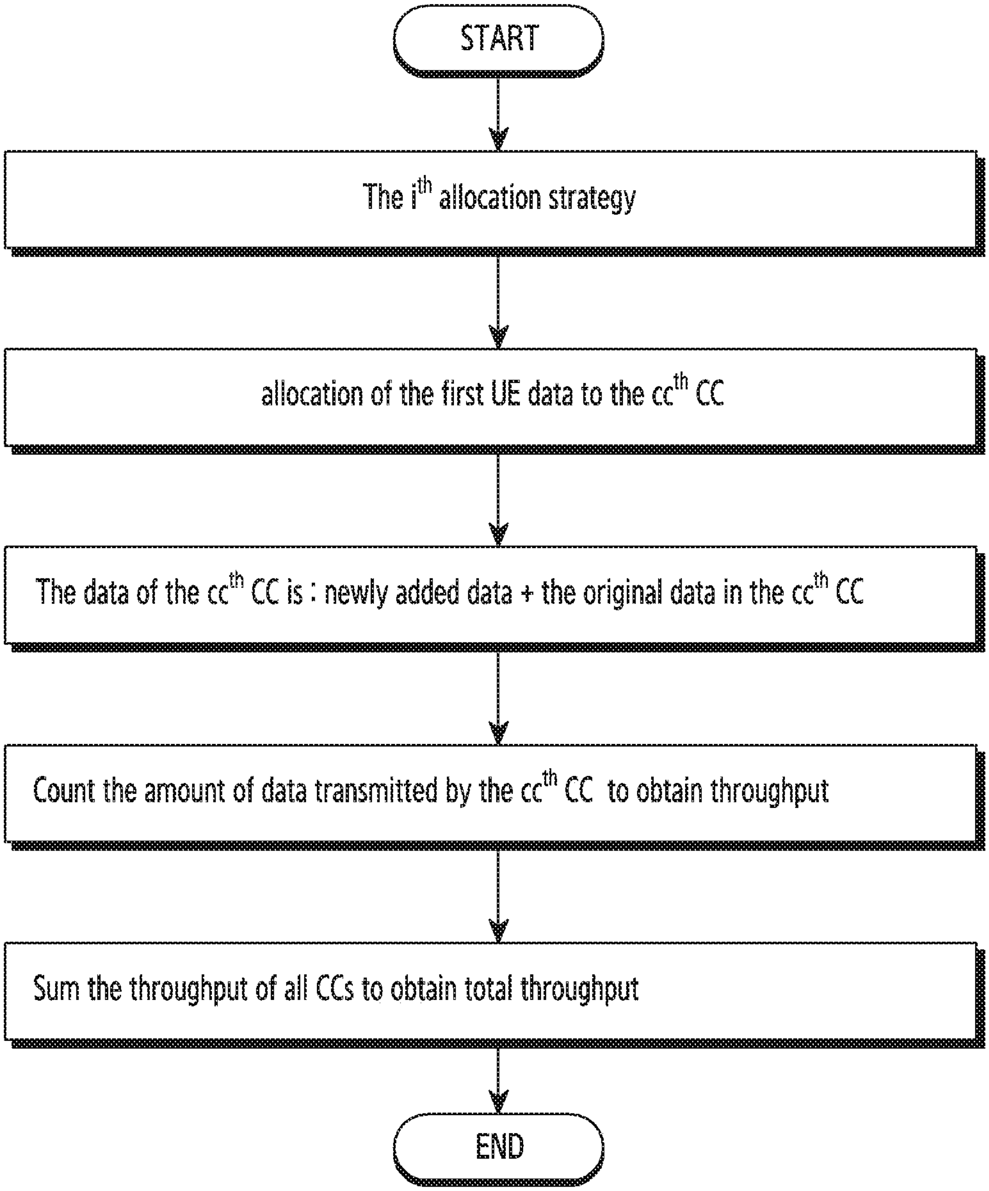
FIG. 15 is a flowchart illustrating an example of throughput calculation according to various embodiments.

Optionally, as shown in FIG. 15, the step S902-1 of based on the remaining service data corresponding to each candidate CC and the newly added service data corresponding to each candidate CC after the allocation of the service data to be allocated, determining the total throughput of all candidate CCs comprises the following steps S902-11 to S902-13.

S902-11: The remaining service data corresponding to each candidate CC after the last service data transmission is completed before the current moment is determined.

For example, the remaining service data can be calculated by the following formula (3), where V_HIS (cc) is the remaining service data after the last transmission by a CC buffer region. If it is assumed that the current moment is t, then:

$$V_{HIS}(cc) = V_{Left}(cc, t0) + \sum_{j=t_0}^{t-1} V_{Add}(cc, j) - \sum_{j=t_0}^{t-1} T(cc, j) \qquad \text{Formula (3)}$$

Where $V_{Left}$(cc, t0) represents the amount of data in the buffer region of the $cc^{th}$ CC at the moment t0; $V_{Add}$(cc, j) represents the amount of newly added data in the buffer region of the $cc^{th}$ CC at the moment j; and, T(cc, j) represents the amount of transmitted data in the buffer region of the $cc^{th}$ CC at the moment j and can be equal to the throughput after time unit conversion.

S902-12: The newly added service data corresponding to each candidate CC after the allocation of the service data to be allocated is determined.

For example, the newly added service data can be calculated by the following formula (4). When the service data to be allocated is allocated to a candidate CC, the buffer size of the CC is increased by the corresponding result of allocation.

$$V_{Add}(cc) - \sum_{l=1}^{UE_{num}} V_{Alloc}(l, cc) \qquad \text{Formula (4)}$$

Where $V_{Add}$(cc) is the newly added service data of the $cc^{th}$ CC; $UE_{num}$ is the number of UEs; and, $V_{Alloc}$(l, cc) is the service data allocated to the candidate CC by the $I^{th}$ UE.

S902-13: All service data of the candidate CC at the current moment is determined based on the maximum transmission ability, the remaining service data and the newly added service data of each candidate CC, and the total throughput of all candidate CCs is determined based on the all service data.

Specifically, all data on the candidate CCs can be expressed by the following formula (5), where all data (including the newly added service data and the remaining service data) on the $cc^{th}$ CC at the current moment is denoted by $V_{Trans}$ (cc):

$$V_{Trans}(cc)=\min\{[V_{Add}(cc)+V_{His}(cc)],CC_{ability}\} \qquad \text{Formula (5)}$$

Where $CC_{ability}$ represents the maximum transmission ability on the corresponding CC, and the value of $CC_{ability}$ is related to the channel condition, the carrier bandwidth, etc.

In the embodiments of the present disclosure, for the $i^{th}$ candidate allocation strategy, $V_{Trans}$ (cc) will be converted into the throughput T(cc), that is, $V_{Trans}$ (cc)→T(cc). The throughput of this candidate CC is obtained by the amount of data allocated for the $cc^{th}$ CC. Therefore, the throughput is equal to the accumulated result of all service data in all CCs.

Determining the transmission delay related information corresponding to each candidate allocation strategy will be described in greater detail below.

In an embodiment, the transmission delay related information comprises mean delay information and/or delay difference information. Specifically, the step S902 of determining transmission delay related information corresponding to the at least one candidate allocation strategy comprises at least one of the following steps S902-2 to S902-3.

S902-2: For each candidate allocation strategy, a refer, for example, to a delay of all UEs when the service data to be allocated is allocated to each candidate CC is determined.

For example, to realize the minimum mean delay and the delay fairness, in the present disclosure, the transmission delay for service data of UEs is defined as a random variable. The mean delay E, of UEs can be expressed by the following formula (6):

$$E_i = (1/UE_{num}) \cdot \sum_{l=1}^{UE_{num}} De(l) \qquad \text{Formula (6)}$$

Where De(l) is the transmission delay of the $I^{th}$ UE.

S902-3: For each candidate allocation strategy, delay difference information of all UEs when the service data to be allocated is allocated to each candidate CC is determined.

To realize the minimum mean delay and the delay fairness, in the embodiments of the present disclosure, the transmission delay for service data of UEs is defined as a random variable. Considering that kurtosis can represent the concentration level of variables in the statistic field, in the embodiments of the present disclosure, kurtosis can be used to measure the difference in transmission delay between UEs. Specifically, the following two situations can be included: (1) similar transmission delays correspond to high peak values (fair delay); and, (2) different transmission delays correspond to low peak values (unfair delay).

An example process of determining the target allocation strategy based on the throughput information and the transmission delay related information will be described in greater detail below.

Figure 11:
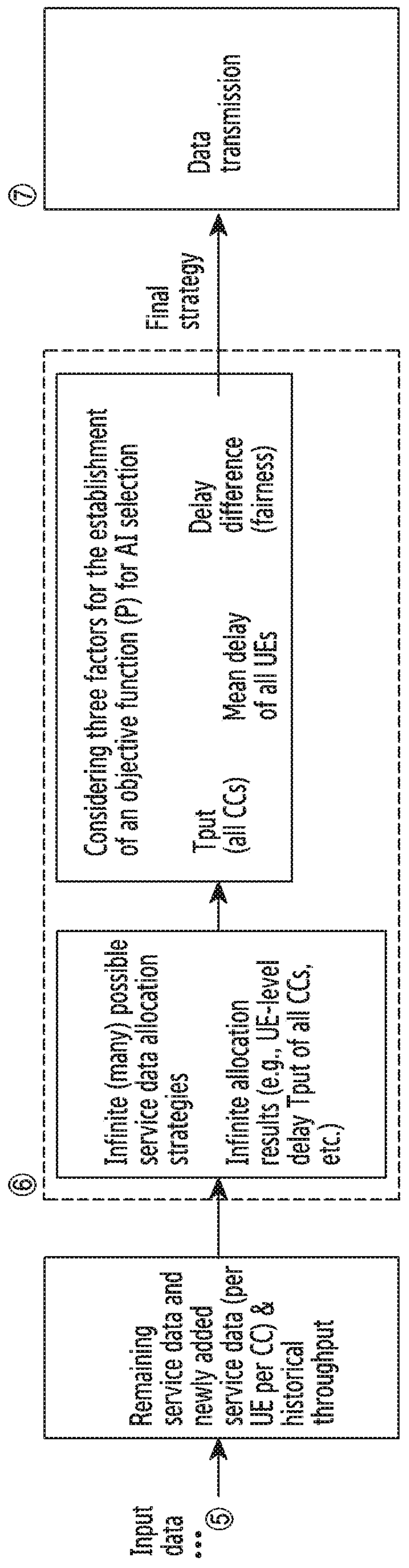
FIG. 11 is a flowchart illustrating an example multi-dimensional traffic allocation method according to various embodiments.

An objective function is constructed to quantitatively express the allocation effect corresponding to each candidate allocation strategy; and then, a target allocation is selected based on the allocation effect. To better describe the process of selecting a target allocation strategy based on artificial intelligence (AI) in the present disclosure, the method of avoiding a locally optimal solution based on AI will be described below with reference to FIGS. 11 and 12. It should be understood that an optimal target allocation strategy is selected from multiple candidate allocation strategies based on the preset objective function by an AI learning method.

For example, during the AI processing, the input data incudes: the remaining service data of each candidate CC, the newly added service data when the service data to be allocated for each UE is allocated to each candidate CC, and historical transmission volume (e.g., historical throughput).

Example embodiments of the present disclosure are intended to increase the throughput of all CCs corresponding to the base station, reduce the overall transmission delay for service data of all UEs in a higher layer (e.g., an RLC layer) and balance the difference in delay between UEs. The resource allocation method provided by the embodiments of the present disclosure can be executed in a higher layer (e.g., an RLC layer). On this basis, in example embodiments of the present disclosure, the core method of multi-dimensional traffic allocation is embodied on the constructed objective function. The objective function will be described below.

The background of constructing the objective function will be described. In the embodiments of the present disclosure, a base station needs to allocation the traffic of a UE to each CC for transmission, so it is necessary to determine the numerical value of the traffic to be allocated to each CC. The numerical value of the traffic to be allocated may be any value ranging from 0 to the total traffic of the UE. Therefore, there are numerous allocation strategies for the base station to allocate the traffic to each CC.

The allocation effect reflected by the objective function will be described below. In the embodiments of the present disclosure, the effects to be achieved include: (1) the total throughput of all UEs is obtained as high as possible; (2) the delay for all UEs is as small as possible, that is, the mean of delay for all UEs is as small as possible; and, the difference in delay between different UEs is balanced, that is, the difference in delay between all UEs is as small as possible.

To quantitatively reflect the effects achieved by the above objectives, the allocation effect is reflected by defining a P value (an allocation effect value) in the present disclosure. If the P value is larger, the corresponding candidate allocation strategy can better satisfy the above three objectives.

It should be understood that there are infinite (many) possible candidate allocation strategies. Each strategy will cause a different throughput or UE delay. The relationship represented by the objective function can be expressed by the following formula (7):

$$P=\text{sum(all UEs' Tput)}\times(\text{Fairness}/\text{EXP(mean of delay)}) \quad \text{Formula (7)}$$

Where P is an allocation effect value, and each P value corresponds to one allocation strategy. The sum (all UEs' Tput) is a first factor representing the total throughput of all UEs. The larger the value of the first factor is, the higher the degree of objective achievement is. The Fairness/EXP (mean of delay) is a second factor, where Fairness represents the fairness and can be embodied by kurtosis. The smaller the difference in delay between UEs is, the larger the value of Fairness is. The EXP (mean of delay) is a power exponent of the mean of delay. The powder exponent is used to make the rate of change of the mean of delay comparable to the rate of change of the kurtosis function, so as to ensure that the value of the second factor is not too small. The EXP (mean of delay) is a delay control parameter for achieving the purpose of low waiting time of high-layer service data.

Figure 16:
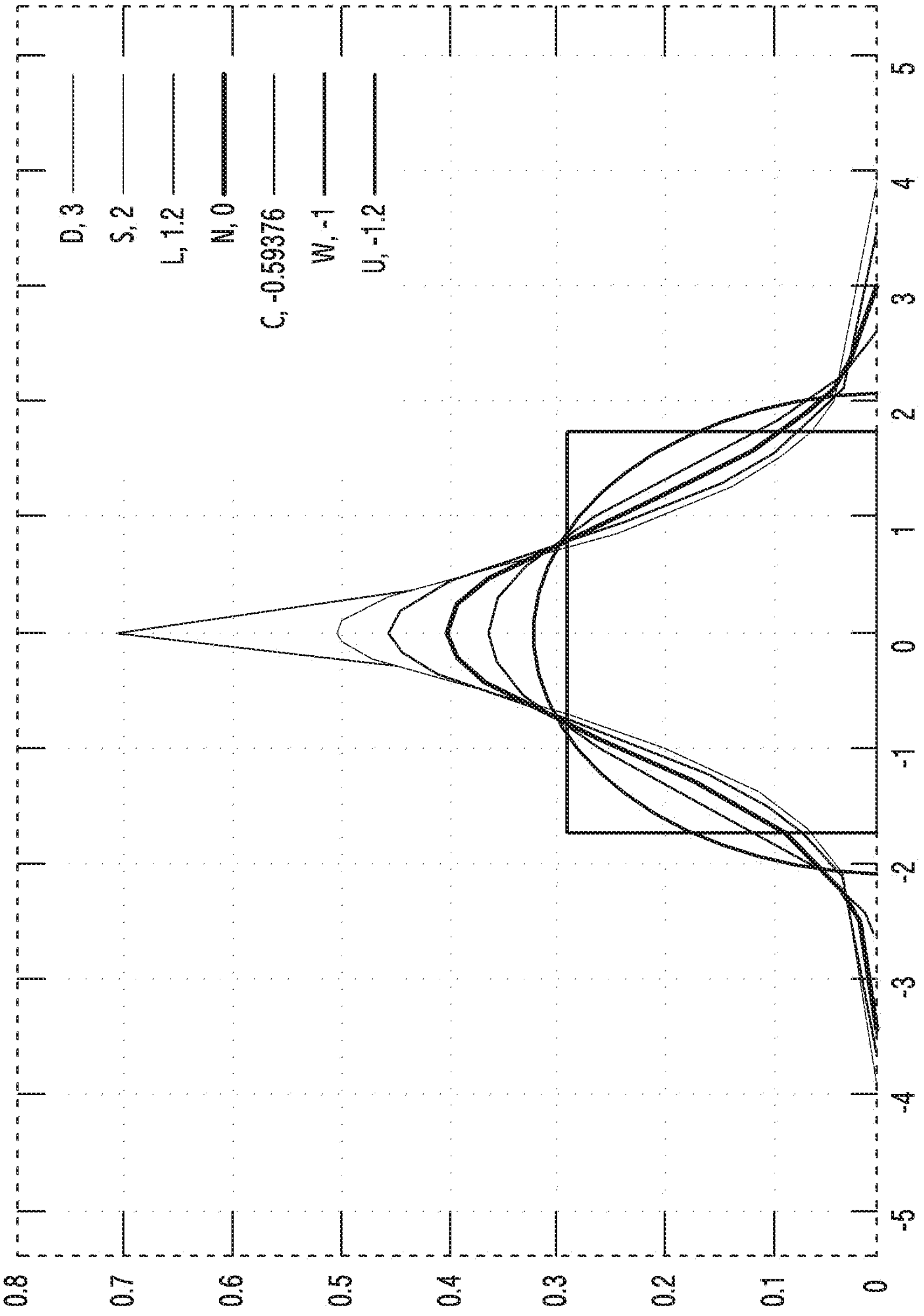
FIG. 16 is a graph illustrating an example of a kurtosis relationship between different distributions according to various embodiments.

The kurtosis can be embodied as shown in FIG. 16.

In example embodiments of the present disclosure, although infinite candidate allocation strategies will lead to infinite values of the first factor and infinite values of the second factor, a proper strategy can be found by the AI technology. A better candidate allocation strategy corresponds to a higher allocation effect value P. Therefore, a proper target allocation strategy can be selected by AI in the present disclosure, and the AI selection is more effective than traversing all strategies.

In the embodiments of the present disclosure, the physical meaning of the objective function can be interpreted as quantitatively reflecting the resource allocation target of the base station by the weighted multiplication of two influence factors. The first factor is defined as the throughput sum of all UEs. The second factor includes a fraction. The numerator is the kurtosis value of the delay for UEs, and the denominator is the power exponent of the mean of delay for UEs.

During the calculation of the objective function, for the throughput sum of all UEs corresponding to the first factor, the existing traffic (the remaining service data) on each candidate and the traffic to be allocated (newly added service data) to this candidate CC can be summed and then compared with the maximum value of the data transmitted once by this candidate CC to obtain the traffic that can be transmitted by this candidate CC during one transmission. The time occupied by one transmission is generally one time slot, and the duration of one time slot is a fixed value. Therefore, the data amount transmitted once by this candidate CC is divided by the duration of one time slot (which is converted into the number of bits transmitted per second) to obtain the throughput on one candidate CC. The throughput of all users on all candidate CCs are summed to obtain the value of the first factor.

During the calculation of the objective function, the numerator of the second factor, e.g., the kurtosis value of the delay for UEs, can be calculated by the following formula (8):

$$K_i=\frac{\left\{\left(1/UE_{num}\right)\cdot\sum_{l=1}^{UE_{num}}\left[De(l)-\overline{De}\right]^4\right\}+o(De)}{\left\{\left(1/UE_{num}\right)\cdot\sum_{l=1}^{UE_{num}}\left[De(l)-\overline{De}\right]^2\right\}^2+o(De)} \quad \text{Formula (8)}$$

Where De(l) is the transmission delay of the $l^{th}$ UE; $\overline{De}$ is the mean of transmission delay of all UEs; and, o(De) is infinitesimal of higher order. It should be understood that different allocation strategies will obtain different De(l).

Optimization of allocation strategy selection can be summarized as follows. If it is assumed that there are c CCs transmitting the data of UEs, one candidate allocation strategy can be expressed as a sequence of c numbers, for example, in the format of $[Data_1, Data_2, \ldots, Data_c]_{1\times}c$. The numbers in the sequence represent the amount of data allocated to corresponding CCs. As shown in the above formula (7), the P value can be calculated by the throughput and the delay. The throughput and the delay can be obtained by $[Data_1, Data_2, \ldots, Data_c]_{1\times c}$, that is, the P value is finally determined by a candidate allocation strategy.

Figure 12:
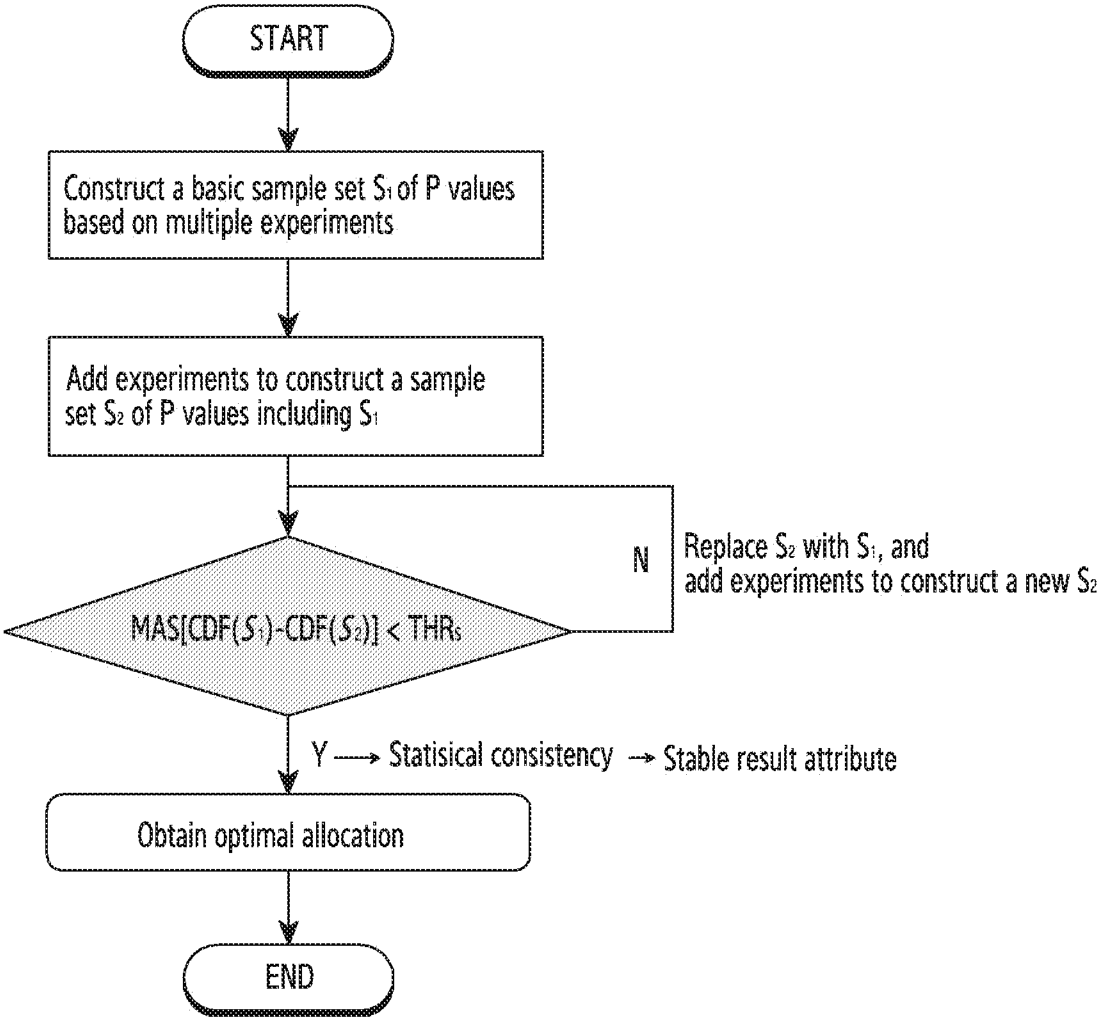
FIG. 12 is a flowchart illustrating an example of avoiding a locally optimal solution based on AI selection according to various embodiments.

During the AI solution, the challenge is to avoid locally optimal solutions. In the present disclosure, as shown in FIG. 12, due to an uncertain number of experiments, a large number of experiments are required. In the present disclosure, this situation is addressed using the cumulative distribution function (CDF) and statistical consistency.

If the statistic consistency of the experimental results remains unchanged, the experiments will be stopped before the configured number (e.g., the preset number of experiments) is reached. It can be indicated by formula |CDF(S1)−CDF(S2)|<T HRs (the threshold may be 0.05 or may be set according to the actual situation, and this will not be limited in the present disclosure) that the sample set S1 and the sample set S2 are conformity with the statistical consistency. S1 is a sample set of P values constructed by multiple experiments, and S2 is a sample set of P values constructed by experiments, including S1 (that is, S2=S1+S3, where S3 is a sample set of P values constructed by additional experiments). When it is indicated that the sample set S1 and the sample set S2 are conformity with the statistical consistency, it can also be expressed by formula Max[|CDF(S1)−CDF(2)|]<T HRs. For example, if the absolute value of the largest difference between the CDF value of the sample set S1 and the CDF value of the sample set S2 is still less than the fixed threshold T HRs, it can be considered that the algorithm constructed based on the objective function tends to be stable.

Figure 13A:
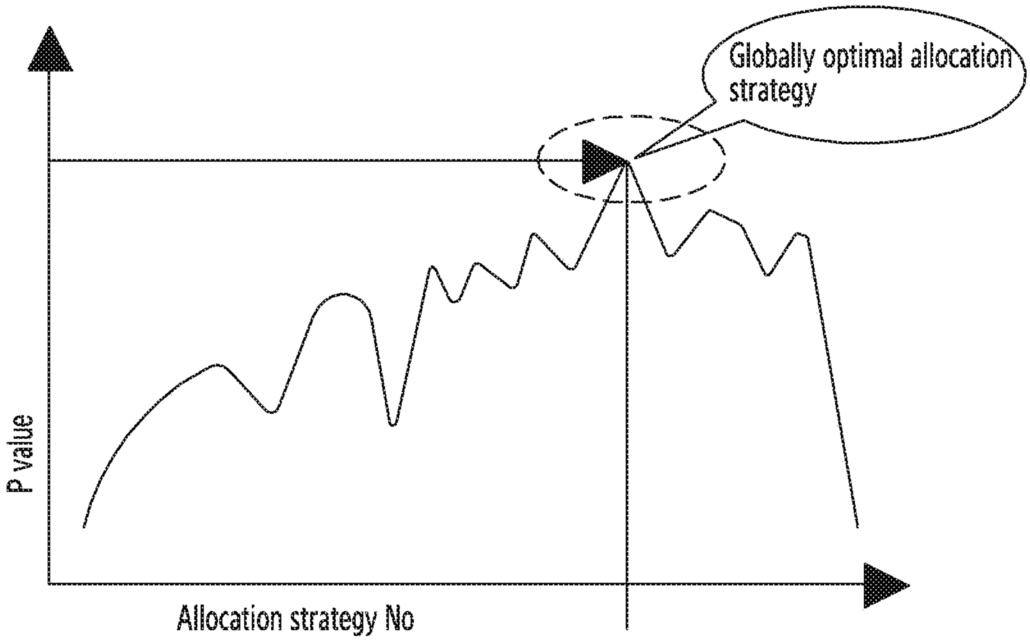
FIG. 13A is a graph illustrating an example of addressing a globally optimal allocation strategy according to various embodiments.

Therefore, optimization of allocation strategy selection can also be described as follows: it is necessary to find a target allocation strategy which as the largest P value. Since there are infinite candidate allocation strategies, it is impossible to calculate P values corresponding to all candidate allocation strategies. If it is only intended to explain the optimization of allocation strategy selection, it is assumed that P values corresponding to all candidate allocation strategies can be calculated and the two-dimensional curve shown in FIG. 13A is drawn by sequentially arranging the P values according to the candidate allocation strategies. It can be seen from FIG. 13*a* that a candidate allocation strategy having the largest P value (e.g., a globally optimal target allocation strategy) is found.

An example process of addressing a globally optimal solution (determining a target allocation strategy) in the various example embodiments of the present disclosure will be described in greater detail below.

In an embodiment, the step S903 of determining a target allocation strategy based on the throughput information and the transmission delay related information comprises the following steps H1 to H3.

Step H1: The candidate allocation strategy is divided into a plurality of subsets.

For example, dividing the candidate allocation strategy into subsets is a preprocessing step of addressing the globally optimal solution. In the embodiments of the present disclosure, all candidate allocation strategies are regarded as a universal set.

For any candidate allocation strategy in the universal set, each data in the sequence satisfies the following condition: $Data_i \in \{Data_1, Data_2, \ldots, Data_c\}$, that is, the value ranges from 0 to the total amount of data requested to be transmitted by the UE (the service data to be allocated). Therefore, in the embodiments of the present disclosure, the range from 0 to the total amount of data requested to be transmitted by the UE can be evenly divided into m intervals. Each number in one candidate allocation strategy sequence necessarily falls into one of the intervals. There are c numbers in the sequence, so there are $m^c$ interval combinations corresponding to one sequence. Since any candidate allocation strategy will fall into one of the $m^c$ interval combinations by the division, the universal set of candidate allocation strategies can be divided into $m^c$ subsets in the embodiments of the present disclosure.

For example, if it is assumed that c=2 and m=2, one candidate allocation strategy is a sequence of two numbers, and each number in the sequence will fall into one of two intervals, so that there are total 4 interval combinations, and the candidate allocation strategies can be divided into 4 subsets.

Step H2: A candidate allocation strategy with an optimal allocation effect value in each subset is determined based on the throughput information and the transmission delay related information.

For example, the throughput information and the transmission delay related information can be quantitatively expressed by the above formula (7) to determine an allocation effect value corresponding to each candidate allocation strategy, so that a candidate allocation strategy with an optimal allocation effect value in each subset is determined.

Step H3: A target allocation strategy is determined from the candidate allocation strategy with an optimal allocation effect value corresponding to each subset.

In the embodiments of the present disclosure, a candidate allocation strategy with an optimal allocation effect value in each subset can be determined based on A1 selection, and a target allocation strategy can be then determined from the candidate allocation strategies with an optimal allocation effect value in all subsets. For example, the candidate allocation strategy with the largest allocation effect value can be selected as a target allocation strategy for allocating the service data to be allocated.

Figure 13B:
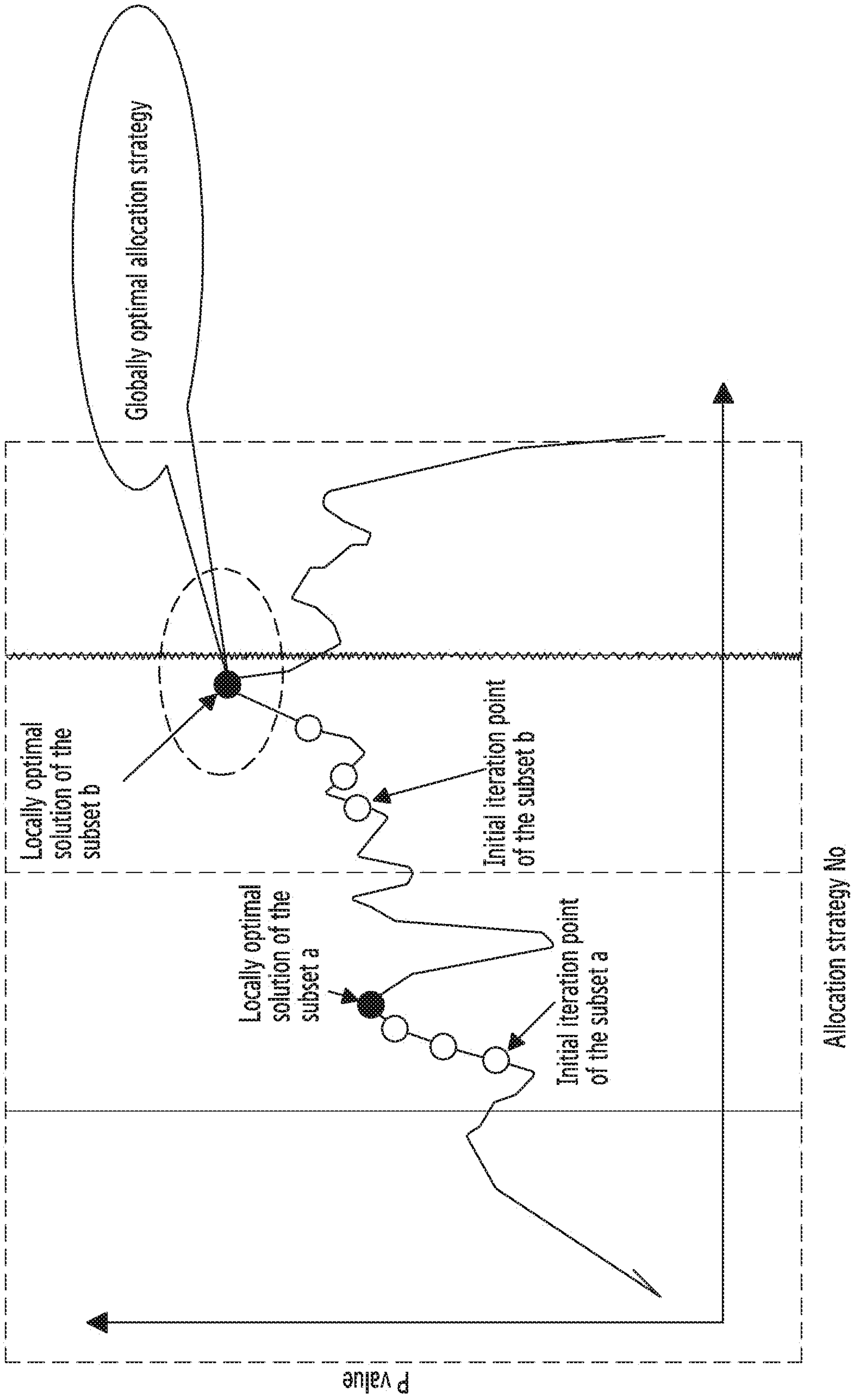
FIG. 13B is a graph illustrating an example of addressing a globally optimal allocation strategy according to various embodiments.

Optionally, for convenience of description, in the embodiments of the present disclosure, the process of solving the globally optimal solution is defined as two stages, as shown in FIG. 13B.

First stage: Corresponding to the step H2, a locally optimal P value in each allocation strategy subset is calculated by iterative calculation, and the candidate allocation strategy corresponding to the largest P value in the subset is used as a locally optimal allocation strategy.

For example, for each subset, n candidate allocation strategies are selected as initial allocation strategies, where n may be an integer greater than or equal to 3. The candidate allocation strategy with the largest P value in the subset is searched iteratively.

The above process is shown in FIG. 13B, and initial allocation strategies (corresponding to initial iteration points in the figure) are randomly selected from each subset. A new candidate allocation strategy is generated by iteratively calculating the P value, and the candidate allocation strategy corresponding to the optimal P value is iteratively searched. The candidate allocation strategy with the largest P value is a locally optimal candidate allocation strategy (corresponding to the locally optimal solution in the figure) in the current subset.

Second stage: Corresponding to the step H3, a globally optimal target allocation strategy (corresponding to a globally optimal allocation strategy in the figure) is searched from all locally optimal candidate allocation strategies.

For example, in the second stage, the candidate allocation strategy with the largest P value is searched from the locally optimal solutions of all subsets to serve as a globally optimal target allocation strategy, as a final output of solving the optimization problem.

Optionally, the processes in the first stage and the second stage can be repeated for multiple times to select an allocation strategy with the largest P value as a globally optimal solution.

The process of selecting the optimal solution can refer to FIG. 13B. In the first stage, locally optimal candidate allocation strategies in subsets (e.g., the locally optimal solution in the subset a and the locally optimal solution in the subset b) are selected from the subsets. In the second stage, the locally optimal candidate allocation strategy with the largest P value in all subsets is searched as the globally optimal target allocation strategy (e.g., the locally optimal solution in the subset b).

An example process of determining locally optimal solutions in the first stage will be described in greater detail below.

In an embodiment, the step H2 of determining a candidate allocation strategy with an optimal allocation effect value in each subset based on the throughput information and the transmission delay related information is for example: executing the following steps H21 to H22 for candidate allocation strategies included in each subset.

Step H21: A preset number of candidate allocation strategies are selected as initial allocation strategies in the current subset.

For example, n candidate allocation strategies are selected as initial allocation strategies in one subset. As shown in FIG. 13B, the initial allocation strategies are starting points of the iterative calculation of the current subset. The n may be an integer greater than or equal to 3.

Optionally, a preset number n of candidate allocation strategies can be selected randomly.

Step H22: Based on the throughput information and transmission delay related information corresponding to the initial allocation strategies, allocation effect values of candidate allocation strategies in the current subset are iteratively calculated, and a candidate allocation strategy with an optimal allocation effect value in the current subset is determined.

For example, using the n initial allocation strategies as starting points, allocation effect values corresponding to the candidate allocation strategies in a subset are calculated iteratively to determine a candidate allocation strategy with a locally optimal P value.

The step H22 may comprise the following steps H221 to H223.

Step H221: Based on the throughput information and transmission delay related information corresponding to each initial allocation strategy, a first allocation effect value corresponding to each initial allocation strategy and a difference between every two first allocation effect values are determined, respectively.

For example, the P values of the n initial allocation strategies are calculated, respectively, and an initial allocation strategy corresponding to the largest P value is selected. The P value can be calculated by an objective function. The objective function is used to quantitatively evaluate the degree to which each candidate allocation strategy satisfies the allocation effect. For example, the first allocation effect value corresponding to each initial allocation strategy can be calculated by the above formula (7).

For example, if it is assumed that there are three initial allocation strategies, there are three first allocation effect values P1, P2 and P3 correspondingly, and the difference between P1 and P2, the difference between P1 and P3, the difference between P2 and P3, the difference P2 and P1, the difference between P3 and P1 and the difference between P3 and P2 are calculated, respectively.

Step H222: An iteration strategy is determined based on two first allocation effect values corresponding to the maximum difference, and allocation effect values corresponding to candidate allocation strategies in the current subset are iteratively determined based on the iteration strategy until the difference between maximum first allocation effect values obtained by adjacent preset times of iterations is less than a preset iteration threshold.

For example, the process of determining an iteration strategy based on two first allocation effect values corresponding to the maximum difference comprises: determining initial allocation strategies for a next iteration. For example, n new initial allocation strategies are selected according to the differences between the n existing initial allocation strategies.

The process of determining the iteration strategy in the step H222 will be described with reference to the step H221. The initial allocation strategy corresponding to the largest P value is searched from the n existing initial allocation strategies. Then, according to the difference between the largest one and smallest one among the P values of the n initial allocation strategies, by solving the difference between the sequence value of the initial allocation strategy corresponding to the largest P value and the sequence value of the initial allocation strategy corresponding to the smallest P value and superimposing a random number in a value range from −1 to 1 (thus forming a random number sequence for newly generated initial allocation strategies, wherein −1 to 1 represents either positive iteration or negative iteration, and the corresponding random number generated by each iteration may be positive or negative), a direction of new initial allocation strategies can be determined. According to the change direction of the sequence numbers, the sequence of the initial allocation strategy corresponding to the largest P value is superimposed with the random number sequence of new initial allocation strategies to obtain new initial allocation strategies. Each new initial allocation strategy uses a new random number to obtain an iteration direction of the new initial allocation strategy. In this way, the process is repeated for n-1 times to obtain n-1 new allocation strategies. Finally, the initial allocation strategy with the largest P value among the existing initial allocation strategies and the n-1 new initial allocation strategies form n new initial allocation strategies.

For example, the initial allocation strategies selected in the step H21 are used as iteration starting points, initial allocation strategies for a next iteration are determined based on the initial allocation strategies, and the locally optimal candidate allocation strategy in the current subset is determined in the continuous iteration process. The ending condition for iteration is that the difference between maximum first allocation effect values obtained by adjacent preset times of iterations is less than the preset iteration threshold.

In n embodiment, the step H222 may comprise the following steps J1 to J3.

Step J1: An iteration direction is determined based on the difference between initial allocation strategies corresponding to two first allocation effect values corresponding to the maximum difference.

For example, an iteration direction can be determined by two first allocation effect values corresponding to the maximum difference. To achieve the purpose of finally selecting an allocation strategy with the largest P value, an iteration direction of allocation strategies selected in a next iteration needs to be determined. Optionally, the direction of allocation strategies can be selected, so that the P values of the allocation strategies will increase fastest in the next iteration.

To obtain the iteration direction, the difference between the allocation strategy sequence with the largest P value and the allocation strategy sequence with the smallest P value among the n current initial allocation strategies can be calculated.

Figure 14:
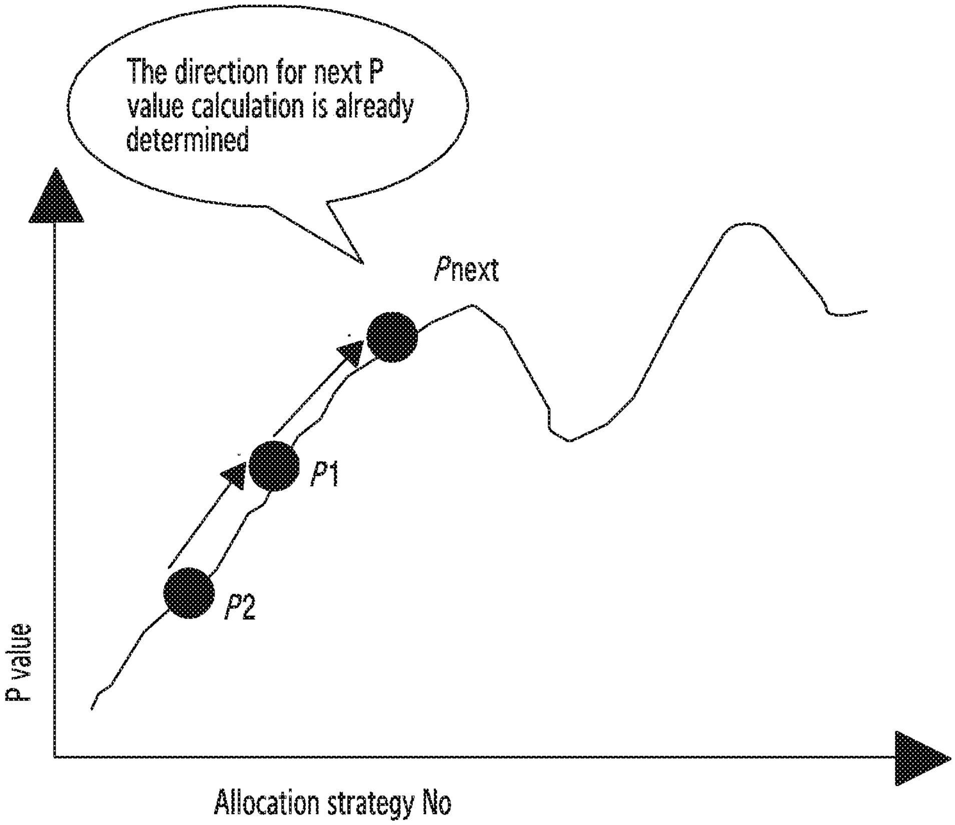
FIG. 14 is a graph illustrating an example of determining an iteration direction according to various embodiments.

For example, n=3, P1-P2 is the maximum difference between P values (that is, P1 id the largest P value and P2 is the smallest P value), and the direction from P2 to P1 is a direction where the P value increases fastest. Therefore, for the newly generated initial allocation strategies, the P value can best continuously grow at a growth rate from P2 to P1, as shown in FIG. 14.

For example, it is assumed that P1=0.006, P2=0.001 and P3=0.003. Thus, P1-P2=0.005, which is the maximum difference among the three P values. If the selected new initial allocation strategy can allow the P value to increase by P1-P2=0.005 on the basis of P1 to obtain P=0.011, the P value will continuously increase at the existing rate.

During the determination of the iteration direction, it is necessary to obtain a difference between the numeral value of the initial allocation strategy sequence corresponding to the largest P value and the numeral value of the initial allocation strategy sequence corresponding to the smallest P value, in the form of $[\text{Random}_1\times(\text{Data}_{great1}-\text{Data}_{small1})+\text{Data}_{great1}, \ldots, \text{Random}_c\times(\text{Data}_{greatc}-\text{Data}_{smallc})+\text{Data}_{greatc}]_{1\times c})$. Every time a new initial allocation strategy is generated, different random number sequences are superimposed in the iteration direction to obtain new initial allocation strategy sequences. In the same way, using different random number sequences, n-1 new initial allocation strategy sequences are obtained.

For example, if it is assumed that there are 5 candidate CCs (c=5), the initial allocation strategy sequence of P1 is [2, 4, 6, 4.2, 0.1] and the initial allocation strategy sequence of P2 is [11.3, 2.4, 5, 1.4, 3], the iteration direction is [−9.3, 1.6, 1, 2.8, −2.9].

Step J2: Initial allocation strategies for a next iteration are determined based on the iteration direction and the initial allocation strategy corresponding to the maximum first allocation effect value.

For example, by implementing the step J2, n-1 new initial allocation strategies can be generated for a next iteration.

For each new initial allocation strategy, a random number sequence having a length of c is generated. Each numerical value in this sequence is superimposed on the corresponding numerical value in the direction sequence (iteration direction) obtained in the step J1 to obtain a new initial allocation strategy $[\text{Random}_1\times(\text{Data}_{great1}-\text{Data}_{small1})+\text{Data}_{great1}, \ldots, \text{Random}_c\times(\text{Data}_{greatc}-\text{Data}_{smallc})+\text{Data}_{greatc}]_{1\times c})$. The operation is repeated for each new initial allocation strategy to be generated to obtain n-1 new initial allocation strategies. Then, the initial allocation strategy corresponding to the maximum first allocation effect value and the n-1 newly generated initial allocation strategies are used as initial allocation strategies for the next iteration.

For example, if n=3, two initial allocation strategies need to be newly generated. For each newly generated initial allocation strategy, 5 (c=5) random numbers are generated and then superimposed sequentially on each numerical value in the direction sequence (iteration direction). If it is assumed that one random number sequence is [0.1, 0.3, 0.1, 0.5, −0.2] which is a continuation of the allocation strategy sequence corresponding to P values in the above example, and the iteration direction is [−9.3, 1.6, 1, 2.8, −2.9], the newly generated initial allocation strategy sequence is [−9.2, 1.9, 1.1,3.3, −3.1].

Step J3: The following steps are repeated until the difference between maximum first allocation effect values obtained by adjacent preset times of iterations is less than the preset iteration threshold: based on the throughput information and transmission delay related information corresponding to each initial allocation strategy, determining a first allocation effect value corresponding to each initial allocation strategy and a difference between every two first allocation effect values; determining an iteration direction based on the difference between initial allocation strategies corresponding to two first allocation effect values corresponding to the maximum difference; and, determining initial allocation strategies for a next iteration based on the iteration direction and the initial allocation strategy corresponding to the maximum first allocation effect value.

For example, the step H221 and the steps J1 and J2 in the step H222 are repeated until the selected largest P value tends to be station (the difference between maximum first allocation effect values obtained by adjacent preset times of iterations is less than the preset iteration threshold). Every time the above steps are repeated, P values corresponding to new initial allocation strategies are obtained by iterations, and the largest P values obtained by last two iterations can be compared. If the difference between the two largest P values is less than a preset threshold, the iteration is terminated, and the step H223 of determining an optimal candidate allocation strategy in the current subset is executed.

Step H223: The candidate allocation strategy corresponding to the maximum first allocation effect value finally obtained by iterations is used as a candidate allocation strategy with an optimal allocation effect value in the current subset.

For example, the initial allocation strategy corresponding to the largest P value finally obtained by iterations is used as a candidate allocation strategy with an optimal allocation effect value in the subset.

The specific process of finding a globally optimal target allocation strategy from all locally optimal candidate allocation strategies will be described below.

In an embodiment, the globally optimal allocation strategy can be obtained by running the steps H1 to H3 for one time. It is also possible to run the step H2 for multiple times and then select the best one from the results of multiple runs as the globally optimal allocation strategy. Optionally, in the case where the step H2 is run for multiple times, the step H3 of determining a target allocation strategy from the candidate allocation strategy with an optimal allocation effect value corresponding to each subset comprises the following steps H31 to H33.

Step H31: A strategy set is constructed based on the currently determined target allocation strategy.

For example, after the steps H1 to H3 are run for one time, a corresponding target allocation strategy can be determined, and a strategy set (e.g., a strategy set A) can be initially constructed based on this target allocation strategy.

Step H32:The steps of determining a candidate allocation strategy with an optimal allocation effect value in each subset and selecting, from the candidate allocation strategies with the optimal allocation effect value in all subsets, a candidate allocation strategy with the maximum allocation effect value as a target allocation strategy are repeated, until the difference between a cumulative distribution value of the currently updated strategy set and a cumulative distribution value of the previously updated strategy set is less than a preset target threshold.

The updated target allocation strategy is obtained by each repetition, and the target allocation strategy is incorporated into the previous strategy set to obtain an updated strategy set.

For example, a corresponding target allocation strategy can be obtained by repeating the steps H2 to H3 for the second time, and an updated strategy set A2 (this strategy set includes the target allocation strategies obtained by running the steps H2 to H3 for the first time and the second time) can be obtained by incorporating the target allocation strategy into the previous strategy set A1. By that analogy, the steps H2 to H3 are repeated continuously, until the difference between a cumulative distribution value of the currently updated strategy set and a cumulative distribution value of the previously updated strategy set is less than a preset target threshold.

The calculation of the cumulative distribution value may refer to the description of the cumulative distribution function (CDF) in the above example embodiments, and may not be repeated here.

Step H33: The target allocation strategy determined during the last repetition is used as a final target allocation strategy.

For example, since the initial allocation strategies are selected randomly in the embodiments of the present disclosure (for example, in the step H21, a preset number of candidate allocation strategies are selected as initial allocation strategies in the current subset), the probability of missing candidate allocation strategies with larger P values is very small. In the present disclosure, further, the steps H2 to H3 are repeated for multiple times, and the globally optimal target allocation strategy and the corresponding largest P value obtained by each repetition are recorded. The recorded P values form a set of P values. A cumulative distribution function (CDF) can be calculated for this set of P values. Every time the steps H2 to H3 are executed to obtain a new P value, this P value is added into the original set of P values to obtain an updated set of P values. The CDF of the set of P values before updating is compared with the CDF of the updated set of P values. If the difference between the two CDFs is less than a preset threshold (preset target threshold), the target allocation strategy corresponding to the P value obtained by repeating the steps H2 to H3 last time is regarded as a globally optimal allocation strategy (final target allocation strategy).

In the present disclosure, an example of addressing the number of A1 iterations to avoid the locally optional solution will be described in greater detail below.

To evaluate the effectiveness of the solutions in the embodiments of the present disclosure, evaluation tests are carried out using 8 CCs and applying 9 groups of 10 to 18 UEs.

For each test, it is assumed that the reference experiment (original) is: the number of UEs×the number of CCs+100. The experimental data of the solution (new) of the present disclosure and the reference experiment (original) is shown in the following table 6.

TABLE 6

| | 10 | 11 | 12 | 13 | 14 | 15 | 16 | 17 | 18 |
|---|---|---|---|---|---|---|---|---|---|
| Original | 180 | 188 | 196 | 204 | 212 | 220 | 228 | 236 | 244 |
| New | 156 | 162 | 168 | 173 | 179 | 184 | 190 | 196 | 201 |

In Table 6, the first row represents the number of applied UEs, which is 9 groups of experimental data from 10 to 18, respectively; the second row represents the corresponding transmission delay when the service data is allocated by the original method (the prior art (for example, when the number of applied UEs is 10, the corresponding transmission delay is 180 ms); and, the third row represents the corresponding transmission delay when the service data is allocated by the resource allocation method provided by the embodiments of the present disclosure (for example, when the number of applied UEs is 10, the corresponding transmission delay is 156 ms). According to the statistical data in Table 6, it can be known that the efficiency is improved by 18.4% (the mean of the experimental data in the groups) by the solution of the present disclosure.

Figure 17:
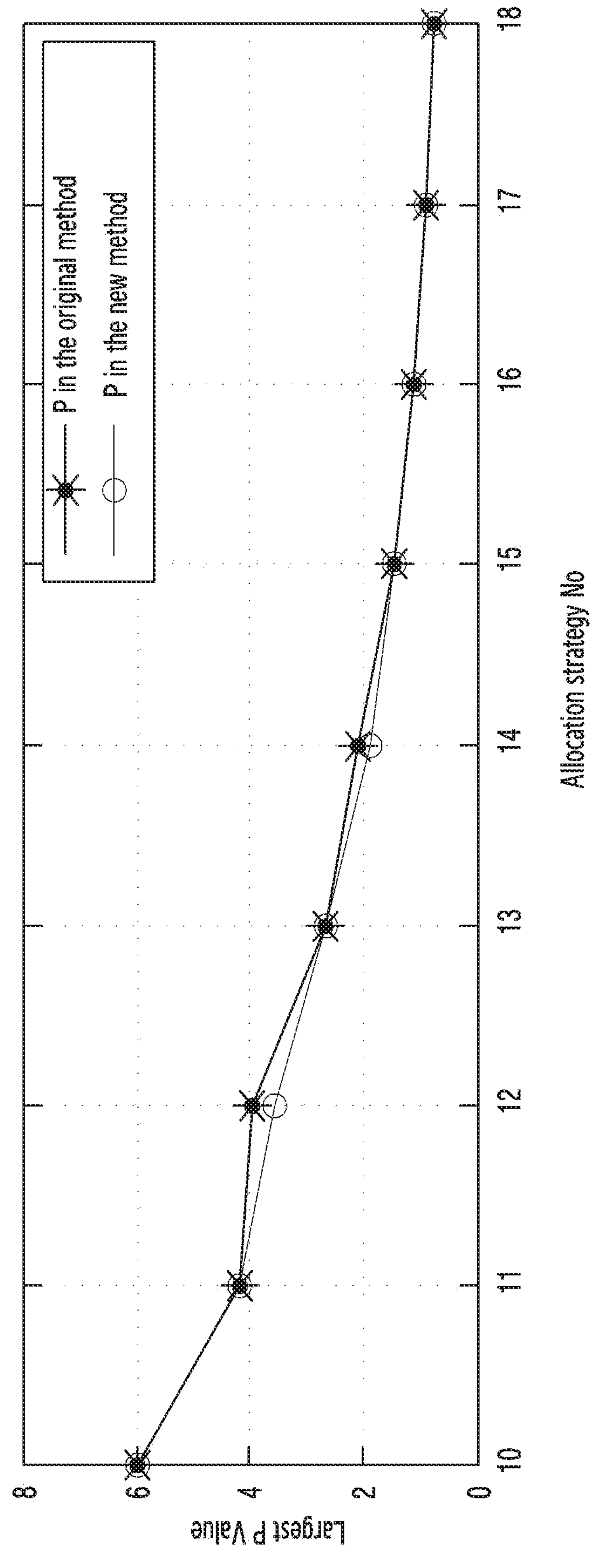
FIG. 17 is a graph illustrating an example of calculation results of P values according to various embodiments.

As shown in FIG. 17, in a case where the largest P value (corresponding to the P in the original method in the figure) in the new method (the resource allocation method provided by the embodiments of the present disclosure) is consistent with the largest P value (corresponding to the P in the original method in the figure) in the original method (the prior art), by the method provided by the embodiments of the present disclosure, the amount of AI calculation is effectively saved while ensuring the P value effect.

The multi-dimensional service allocation method provided by the embodiments of the present disclosure will be described below with reference to FIG. 18.

According to the multi-dimensional traffic allocation method, it can be determined by experiments that the transmission efficiency is improved by 32% by multi-dimensional traffic allocation. The specific evaluation experiment is configured and analyzed as below.

The basic configuration includes 4 CCs as A6G (above a frequency band of 6G Hz). There are 4 UEs having different service requirements. Due to wireless transmission, each CC of the same UE has different transmission conditions. For the prior art and the solution of the present disclosure, the traffic input is the same.

Figure 18:
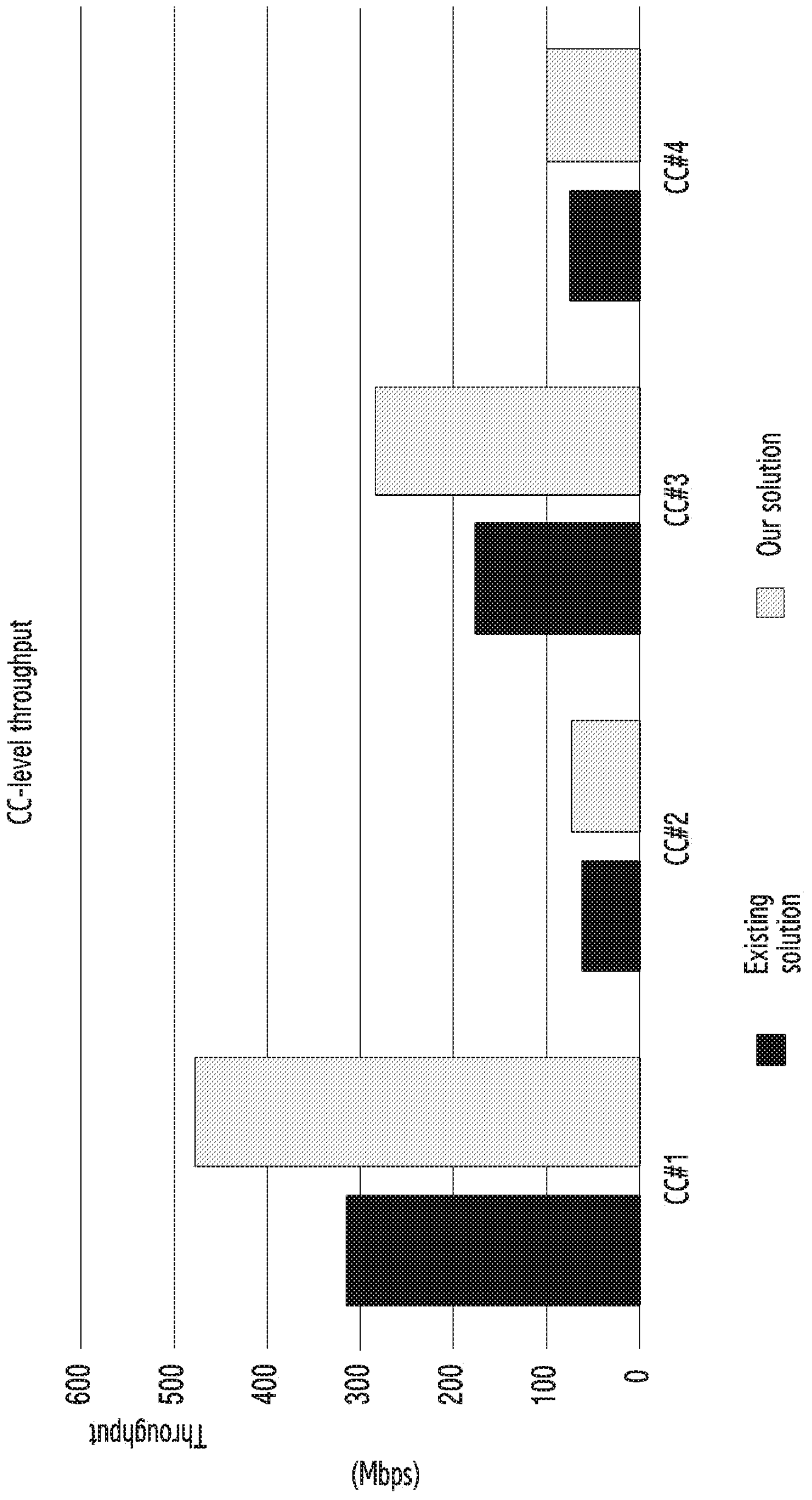
FIG. 18 is a graph illustrating an example of transmission efficiency according to various embodiments.

In a case where the same traffic input is given, the comparison result of the both is shown in FIG. 18. In the experiments, 34 time slots are occupied for data transmission in the prior art, while only 23 time slots are used to transmit all data in the present disclosure. That is, the gain of the transmission efficiency in the present disclosure is 32%. Compared with the prior art, by the solution provided by the embodiments of the present disclosure, higher throughput can be obtained, and it takes less time to transmit the same service data.

Figure 19:
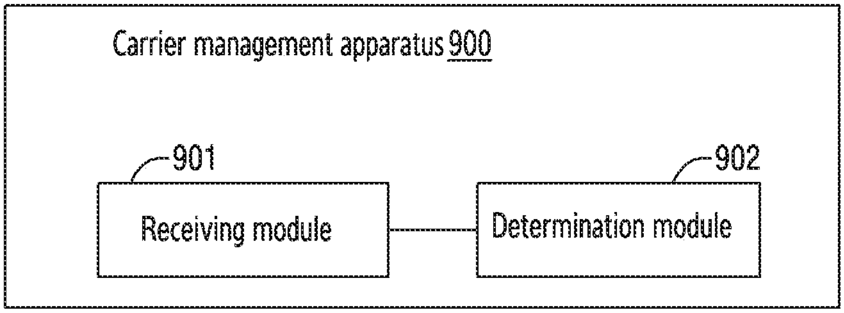
FIG. 19 is a block diagram illustrating an example configuration of a carrier management apparatus according to various embodiments.

As shown in FIG. 19, a block diagram illustrating an example configuration of a carrier management apparatus

900 according to various embodiments is provided, comprising: a receiving module (e.g., including various processing circuitry and/or executable program instructions) 901 and a determination module (e.g., including various processing circuitry and/or executable program instructions) 902.

The receiving module 901 is configured to receive an access request from a target user equipment (UE).

The determination module 902 is configured to determine, from candidate component carriers (CCs), a primary cell (Pcell) of the target UE based on the per-resource block (RB) throughput corresponding to each candidate CC.

Optionally, when the determination module 902 is configured to determine, from candidate component carriers (CCs), a primary cell (Pcell) of the target UE based on the per-resource block (RB) throughput corresponding to each candidate CC, it is configured to:

acquire the maximum value of the per-RB throughput within each reference signal received power (RSRP) range corresponding to each candidate CC; and determine, from candidate CCs, a Pcell of the target UE based on the maximum value of the per-RB throughput.

Optionally, when the determination module 902 is configured to acquire the maximum value of the per-RB throughput within each reference signal received power (RSRP) range corresponding to each candidate CC, it is specifically configured to:

acquire, from a historical correspondence among each candidate CC, each RSRP range and the maximum value of the per-RB throughput, the maximum value of the per-RB throughput within each RSRP range corresponding to each candidate CC;

wherein the historical correspondence is determined based on the RSRP value reported by an existing UE in each candidate CC and the per-RB throughput determined during data transmission.

Optionally, the determining the historical correspondence based on the RSRP value reported by an existing UE in each candidate CC and the per-RB throughput determined during data transmission comprises:

determining the corresponding per-RB throughput based on data transmission information of the existing UE in the candidate CC;

determining a corresponding RSRP range based on the RSRP value reported by the existing UE in the candidate CC; and updating, based on the per-RB throughput of the existing UE, the maximum value of the per-RB throughput corresponding to the candidate CC and the determined RSRP range.

Optionally, the number of RSRP ranges corresponding to each candidate CC is the same as the number of modulation and coding scheme (MCS) levels; and, the minimum RSRP value corresponding to each MCS level is the minimum RSRP value within an RSRP range corresponding to a corresponding candidate CC, and the maximum RSRP value corresponding to each MCS level is the maximum RSRP value within an RSRP range corresponding to a corresponding candidate CC.

Optionally, when the determination module 902 is configured to determine the corresponding per-RB throughput based on data transmission information of the existing UE in the candidate CC, it is specifically configured to:

every time the existing UE in the candidate CC completes a data transmission, calculate the per-RB throughput of the UE during the present data transmission based on the number of RBs scheduled by the present data transmission, the transmission block size (TBS) and the duration of one transmission time interval (TTI).

Optionally, when the determination module 902 is configured to update, based on the per-RB throughput of the existing UE, the maximum value of the per-RB throughput corresponding to the candidate CC and the determined RSRP range, it is specifically configured to:

determine, from the historical correspondence, the maximum value of the per-RB throughput corresponding to the determined RSRP range; and if the per-RB throughput of the UE during the present data transmission is greater than the maximum value of the per-RB throughput corresponding to the determined RSRP range, update the per-RB throughput corresponding to the determined RSRP range as the per-RB throughput of the UE during the present data transmission.

Optionally, when the determination module 902 is configured to acquire, from a historical correspondence among each candidate CC, each RSRP range and the maximum value of the per-RB throughput, the maximum value of the per-RB throughput within each RSRP range corresponding to each candidate CC, it is specifically configured to:

acquire, from a historical correspondence in an activated state, the maximum value of the per-RB throughput within each RSRP range corresponding to each candidate CC;

wherein, if the number of times when the difference of the maximum value of the per-RB throughput stored within each RSRP range in the historical correspondence before and after updating is less than a preset update threshold reaches a preset activation threshold, it is determined that the historical correspondence is in an activated state.

Optionally, when the determination module 902 is configured to determine, from candidate CCs, a Pcell of the UE based on the maximum value of the per-RB throughput, it is specifically configured to:

determine, based on an RSRP value reported by the target UE and from the historical correspondence, the maximum value of the per-RB throughput within an RSRP range corresponding to the RSRP value;

based on the resource utilization information of candidate CCs, the number of RBs of CCs and the maximum value of the per-RB throughput corresponding to the RSRP value reported by the target UE, screen candidate CCs to obtain a candidate CC set including at least one candidate CC; and determine a Pcell of the target UE from the candidate CC set.

Optionally, when the determination module 902 is configured to determine, from candidate CCs, a Pcell of the UE based on the maximum value of the per-RB throughput, it is specifically configured to:

determine, based on the RSRP value reported by the target UE and from the historical correspondence, candidate CCs corresponding to the RSRP value;

for each candidate CC corresponding to the RSRP value reported by the target UE, determine a proportion value of the candidate CC based on the number of UEs accessed by the candidate CC and resource utilization information; and determine, from the candidate CCs corresponding to the RSRP value reported by the target UE, a Pcell of the target UE based on the proportion value.

Optionally, when the determination module 902 is configured to determine a proportion value of the candidate CC based on the number of UEs accessed by the candidate CC and resource utilization information, it is specifically configured to:

based on a first weight corresponding to the number of accessed UEs and a second weight corresponding to the resource utilization information, determine a weighted sum of the candidate CC;

if the first weight is less than the second weight, use the reciprocal of the weighted sum as the proportion value of the candidate CC; and if the first weight is greater than the second weight, use the weighted sum as the proportion value of the candidate CC.

Optionally, the carrier management apparatus 900 further comprises:

a strategy acquisition module, configured to acquire at least one candidate allocation strategy for allocating service data to be allocated to at least one candidate CC;

a first determination module, configured to determine throughput information and transmission delay related information corresponding to the at least one candidate allocation strategy;

a second determination module, configured to determine a target allocation strategy based on the throughput information and the transmission delay related information; and a data allocation module, configured to allocate the service data to be allocated based on the target allocation strategy.

Optionally, when the first determination module is configured to determine throughput information corresponding to the at least one candidate allocation strategy, it is specifically configured to:

execute the following, step for each candidate allocation strategy: based on the remaining service data corresponding to each candidate CC and the newly added service data corresponding to each candidate CC after the allocation of the service data to be allocated, determining the total throughput of all candidate CCs.

Optionally, the transmission delay related information comprises: mean delay information and/or delay difference information; and, when the first determination module is configured to determine transmission delay related information corresponding to the at least one candidate allocation strategy, it is specifically configured to:

execute the following step for each candidate allocation strategy: determining a mean delay of all UEs when the service data to be allocated is allocated to each candidate CC; and/or execute the following step for each candidate allocation strategy: determining delay difference information of all UEs when the service data to be allocated is allocated to each candidate CC.

Optionally, when the first determination module is configured to, based on the remaining service data corresponding to each candidate CC and the newly added service data corresponding to each candidate CC after the allocation of the service data to be allocated, determine the total throughput of all candidate CCs, it is specifically configured to:

determine the remaining service data corresponding to each candidate CC after the last service data transmission is completed before the current moment;

determine the newly added service data corresponding to each candidate CC after the allocation of the service data to be allocated; and determine all service data of the candidate CC at the current moment based on the maximum transmission ability, the remaining service data and the newly added service data of each candidate CC, and determining the total throughput of all candidate CCs based on the all service data.

Optionally, when the second determination module is configured to determine a target allocation strategy based on the throughput information and the transmission delay related information, it is specifically configured to:

divide the candidate allocation strategy into a plurality of subsets;

determine a candidate allocation strategy with an optimal allocation effect value in each subset based on the throughput information and the transmission delay related information; and determine a target allocation strategy from the candidate allocation strategy with an optimal allocation effect value corresponding to each subset.

Optionally, when the second determination module is configured to determine a candidate allocation strategy with an optimal allocation effect value in each subset based on the throughput information and the transmission delay related information, it is specifically configured to:

execute the following steps for candidate allocation strategies included in each subset:

select a preset number of candidate allocation strategies as initial allocation strategies in the current subset; and based on the throughput information and transmission delay related information corresponding to the initial allocation strategies, iteratively calculate allocation effect values of candidate allocation strategies in the current subset, and determining a candidate allocation strategy with an optimal allocation effect value in the current subset.

Optionally, when the second determination module is configured to, based on the throughput information and transmission delay related information corresponding to the initial allocation strategies, iteratively calculate allocation effect values of candidate allocation strategies in the current subset, and determine a candidate allocation strategy with an optimal allocation effect value in the current subset, it is specifically configured to:

based on the throughput information and transmission delay related information corresponding to each initial allocation strategy, determine a first allocation effect value corresponding to each initial allocation strategy and a difference between every two first allocation effect values;

determine an iteration strategy based on two first allocation effect values corresponding to the maximum difference, and iteratively determining, based on the iteration strategy, allocation effect values corresponding to candidate allocation strategies in the current subset until the difference between maximum first allocation effect values obtained by adjacent preset times of iterations is less than a preset iteration threshold; and use the candidate allocation strategy corresponding to the maximum first allocation effect value finally obtained by iterations as a candidate allocation strategy with an optimal allocation effect value in the current subset.

Optionally, when the second determination module is configured to determine an iteration strategy based on two first allocation effect values corresponding to the maximum difference, and iteratively determining, based on the iteration strategy, allocation effect values corresponding to candidate allocation strategies in the current subset until the difference between maximum first allocation effect values obtained by adjacent preset times of iterations is less than a preset iteration threshold, it is specifically configured to:

- determine an iteration direction based on the difference between initial allocation strategies corresponding to two first allocation effect values corresponding to the maximum difference;
- determine initial allocation strategies for a next iteration based on the iteration direction and the initial allocation strategy corresponding to the maximum first allocation effect value; and
- repeat the following steps until the difference between maximum first allocation effect values obtained by adjacent preset times of iterations is less than the preset iteration threshold: based on the throughput information and transmission delay related information corresponding to each initial allocation strategy, determining a first allocation effect value corresponding to each initial allocation strategy and a difference between every two first allocation effect values; determining an iteration direction based on the difference between initial allocation strategies corresponding to two first allocation effect values corresponding to the maximum difference; and, determining initial allocation strategies for a next iteration based on the iteration direction and the initial allocation strategy corresponding to the maximum first allocation effect value.

Optionally, when the second determination module is configured to determine a target allocation strategy from the candidate allocation strategy with an optimal allocation effect value corresponding to each subset, it is specifically configured to:

- construct a strategy set based on the currently determined target allocation strategy;
- repeat the steps of determining a candidate allocation strategy with an optimal allocation effect value in each subset and selecting, from the candidate allocation strategies with the optimal allocation effect value in all subsets, a candidate allocation strategy with the maximum allocation effect value as a target allocation strategy, until the difference between a cumulative distribution value of the currently updated strategy set and a cumulative distribution value of the previously updated strategy set is less than a preset target threshold; and
- use the target allocation strategy determined during the last repetition as a final target allocation strategy.

Figure 20:
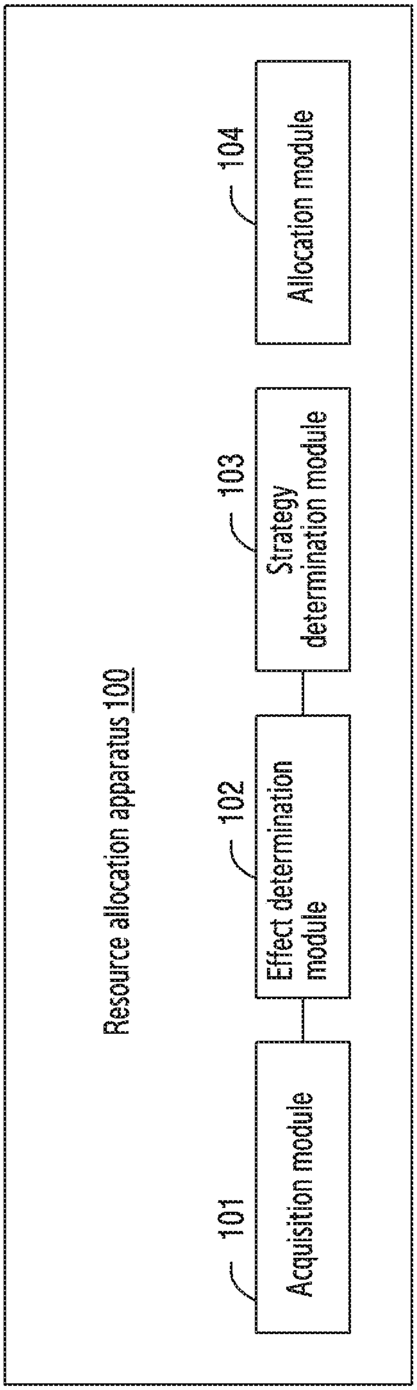
FIG. 20 is a block diagram illustrating an example configuration of a resource allocation apparatus according to various embodiments.

In an example embodiment, as shown in FIG. 20, a block diagram illustrating an example configuration of a resource allocation apparatus 100 according to various embodiments is provided. The resource allocation apparatus 100 may include an acquisition module (e.g., including various processing circuitry and/or executable program instructions) 101, an effect determination module (e.g., including various processing circuitry and/or executable program instructions) 102, a strategy determination module (e.g., including various processing circuitry and/or executable program instructions) 103 and an allocation module (e.g., including various processing circuitry and/or executable program instructions) 104, wherein the acquisition module 101 is configured to acquire at least one candidate allocation strategy for allocating service data to be allocated to at least one candidate CC; the effect determination module 102 is configured to determine throughput information and transmission delay related information corresponding to the at least one candidate allocation strategy; the strategy determination module 103 is configured to determine a target allocation strategy based on the throughput information and the transmission delay related information; and, the allocation module 104 is configured to allocate the service data to be allocated based on the target allocation strategy.

Optionally, when the effect determination module 102 is configured to determine throughput information corresponding to the at least one candidate allocation strategy, it is specifically configured to:

- execute the following step for each candidate allocation strategy: based on the remaining service data corresponding to each candidate CC and the newly added service data corresponding to each candidate CC after the allocation of the service data to be allocated, determining the total throughput of all candidate CCs.

Optionally, the transmission delay related information comprises: mean delay information and/or delay difference information; and, when the strategy determination module 102 is configured to determine transmission delay related information corresponding to the at least one candidate allocation strategy, it is specifically configured to:

- execute the following step for each candidate allocation strategy: determining a mean delay of all UEs when the service data to be allocated is allocated to each candidate CC; and/or
- execute the following step for each candidate allocation strategy: determining delay difference information of all UEs when the service data to be allocated is allocated to each candidate CC.

Optionally, when the effect determination module 102 is configured to, based on the remaining service data corresponding to each candidate CC and the newly added service data corresponding to each candidate CC after the allocation of the service data to be allocated, determine the total throughput of all candidate CCs, it is specifically configured to:

- determine the remaining service data corresponding to each candidate CC after the last service data transmission is completed before the current moment;
- determine the newly added service data corresponding to each candidate CC after the allocation of the service data to be allocated; and
- determine all service data of the candidate CC at the current moment based on the maximum transmission ability, the remaining service data and the newly added service data of each candidate CC, and determining the total throughput of all candidate CCs based on the all service data.

Optionally, when the strategy determination module 103 is configured to determine a target allocation strategy based on the throughput information and the transmission delay related information, it is specifically configured to:

- divide the candidate allocation strategy into a plurality of subsets;
- determine a candidate allocation strategy with an optimal allocation effect value in each subset based on the throughput information and the transmission delay related information; and
- determine a target allocation strategy from the candidate allocation strategy with an optimal allocation effect value corresponding to each subset.

Optionally, when the strategy determination module 103 is configured to determine a candidate allocation strategy with an optimal allocation effect value in each subset based on the throughput information and the transmission delay related information, it is specifically configured to:

execute the following steps for candidate allocation strategies included in each subset:

select a preset number of candidate allocation strategies as initial allocation strategies in the current subset; and based on the throughput information and transmission delay related information corresponding to the initial allocation strategies, iteratively calculate allocation effect values of candidate allocation strategies in the current subset, and determining a candidate allocation strategy with an optimal allocation effect value in the current subset.

Optionally, when the strategy determination module 103 is configured to, based on the throughput information and transmission delay related information corresponding to the initial allocation strategies, iteratively calculate allocation effect values of candidate allocation strategies in the current subset, and determine a candidate allocation strategy with an optimal allocation effect value in the current subset, it is specifically configured to:

based on the throughput information and transmission delay related information corresponding to each initial allocation strategy, determine a first allocation effect value corresponding to each initial allocation strategy and a difference between every two first allocation effect values;

determine an iteration strategy based on two first allocation effect values corresponding to the maximum difference, and iteratively determining, based on the iteration strategy, allocation effect values corresponding to candidate allocation strategies in the current subset until the difference between maximum first allocation effect values obtained by adjacent preset times of iterations is less than a preset iteration threshold; and use the candidate allocation strategy corresponding to the maximum first allocation effect value finally obtained by iterations as a candidate allocation strategy with an optimal allocation effect value in the current subset.

Optionally, when the strategy determination module 103 is configured to determine an iteration strategy based on two first allocation effect values corresponding to the maximum difference, and iteratively determining, based on the iteration strategy, allocation effect values corresponding to candidate allocation strategies in the current subset until the difference between maximum first allocation effect values obtained by adjacent preset times of iterations is less than a preset iteration threshold, it is specifically configured to:

determine an iteration direction based on the difference between initial allocation strategies corresponding to two first allocation effect values corresponding to the maximum difference;

determine initial allocation strategies for a next iteration based on the iteration direction and the initial allocation strategy corresponding to the maximum first allocation effect value; and repeat the following steps until the difference between maximum first allocation effect values obtained by adjacent preset times of iterations is less than the preset iteration threshold: based on the throughput information and transmission delay related information corresponding to each initial allocation strategy, determining a first allocation effect value corresponding to each initial allocation strategy and a difference between every two first allocation effect values; determining an iteration direction based on the difference between initial allocation strategies corresponding to two first allocation effect values corresponding to the maximum difference; and, determining initial allocation strategies for a next iteration based on the iteration direction and the initial allocation strategy corresponding to the maximum first allocation effect value.

Optionally, when the allocation module 104 is configured to determine a target allocation strategy from the candidate allocation strategy with an optimal allocation effect value corresponding to each subset, it is specifically configured to:

construct a strategy set based on the currently determined target allocation strategy;

repeat the steps of determining a candidate allocation strategy with an optimal allocation effect value in each subset and selecting, from the candidate allocation strategies with the optimal allocation effect value in all subsets, a candidate allocation strategy with the maximum allocation effect value as a target allocation strategy, until the difference between a cumulative distribution value of the currently updated strategy set and a cumulative distribution value of the previously updated strategy set is less than a preset target threshold; and use the target allocation strategy determined during the last repetition as a final target allocation strategy, wherein the updated target allocation strategy is obtained by each repetition, and the target allocation strategy is incorporated into the previous strategy set to obtain the updated strategy set.

The apparatuses of the various embodiments of the present disclosure can execute the methods provided in the embodiments of the present disclosure, and the implementation principles thereof are similar. The acts executed by the modules in the apparatuses provided in the embodiments of the present disclosure correspond to the steps in the methods provided in the embodiments of the present disclosure. The detailed functional description of the modules in the apparatuses can refer to the description of the corresponding methods described above and will not be repeated here.

The carrier management apparatus and the resource allocation apparatus provided in the embodiments of the present disclosure have been described from the perspective of functional modularization. The electronic device provided according to various example embodiments of the present disclosure will be described from the perspective of hardware materialization, and the computing system of the electronic device will also be described.

Based on the same principles as the methods shown in the embodiments of the present disclosure, an embodiment of the present disclosure further provides an electronic device. This electronic device can comprise, but not limited to: a processor and a memory, wherein the memory is configured to store computer operated instructions, and the processor is configured to execute the carrier management method shown in the embodiments by calling the computer operated instructions. Compared with the prior art, in accordance with the carrier management method in the present disclosure, the throughout is increased, and the service delay is reduced.

Figure 21:
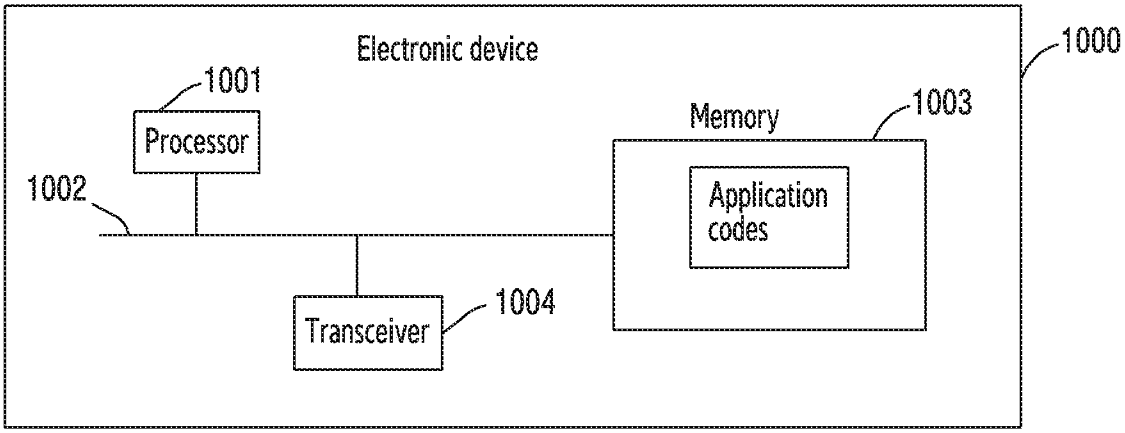
FIG. 21 is a block diagram illustrating an example configuration of an electronic device according to various embodiments.

In an optimal embodiment, an electronic device is provided, as shown in FIG. 21. The electronic device 1000 shown in FIG. 21 which is a block diagram illustrating an example configuration of an electronic device according to various embodiments, comprises a processor (e.g., including processing circuitry) 1001 and a memory 1003. The processor 1001 is connected to the memory 1003, for example, via a bus 1002. Optionally, the electronic device 1000 can further comprise a transceiver 1004. It is to be noted that, in practical applications, the number of the transceiver 1004 is not limited, and the structure of the electronic device 1000 does not include any limitations to the embodiments of the present disclosure.

The processor 1001 can be a central processing unit (CPU), a general-purpose processor, a digital signal processor (DSP), an application specific integrated circuit (ASIC), a field programmable gate array (FPGA) or other programmable logic devices, a transistor logic device, a hardware component or any combination thereof. The processor can implement or execute various example logic blocks, modules and circuits described in the contents of the present disclosure. The processor 1001 can also be a combination for realizing a computation function, for example, a combination of one or more microprocessors, a combination of DSPs and microprocessors, etc.

The bus 1002 can comprise a passageway for transferring information between the above components. The bus 1002 can be a peripheral component interconnect (PCI) bus, an extended industry standard architecture (EISA) bus, etc. The bus 1002 can be classified into an address bus, a data bus, a control bus or the like. For ease of representation, the bus is represented by only one bold line in FIG. 21, but it does not mean that there is only one bus or one type of buses.

The memory 1003 may be, but not limited to, a read only memory (ROM) or other types of static storage devices capable of storing static information and instructions, a random access memory (RAM) or other types of dynamic storage devices capable of storing information and instructions, or an electrically erasable programmable read only memory (EEPROM), compact disc read only memory (CD-ROM) or other optical disk storages, optical disc storages (including compact disc, laser disc, optical disc, digital versatile optical disc, Blu-ray disc, etc.), magnetic disk storage media or other magnetic storage devices, or any other media that can be used to carry or store desired program codes in form of instructions or data structures and can be accessed by a computer.

The memory 1003 is configured to store application codes for executing the solutions in the present disclosure and is controlled by the processor 1001. The processor 1001 is configured to execute the application codes stored in the memory 1003 to implement the contents in the above method embodiments.

The electronic device comprises, but not limited to: mobile terminals, such as mobile phones, notebook computers, digital broadcast receivers, PDAs, PADs, PMPs, vehicle-mounted terminals (e.g., vehicle-mounted navigation terminals; and, fixed terminals, such as digital TVs and desktop computers.

For example, the carrier management method may be executed by a self organizing network (SON) server or other servers, or may be executed by a base station or other access network or core network nodes. The electronic device shown in FIG. 21 may be a server, or may be a base station or other access network or core network devices. The electronic device shown in FIG. 21 is merely an example, and should not be any limitations to the functions and application range of the embodiments of the present disclosure.

An embodiment of the present disclosure provides a non-transitory computer-readable storage medium, wherein the computer-readable storage medium may have stored thereon computer programs that, when executed on a computer, enable the computer to execute the corresponding contents in the above methods.

Figure 22:
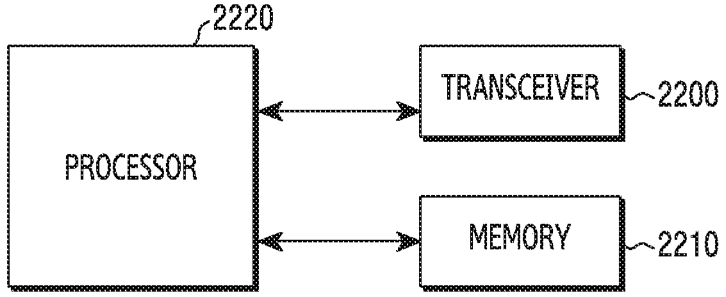
FIG. 22 is a structure of a UE according to an embodiment of the disclosure.

FIG. 22 is a structure of a UE according to an embodiment of the disclosure.

As shown in FIG. 22, the UE according to an embodiment may include a transceiver 2210, a memory 2220, and a processor 2230. The transceiver 2210, the memory 2220, and the processor 2230 of the UE may operate according to a communication method of the UE described above. However, the components of the UE are not limited thereto. For example, the UE may include more or fewer components than those described above. In addition, the processor 2230, the transceiver 2210, and the memory 2220 may be implemented as a single chip. Also, the processor 2230 may include at least one processor. Furthermore, the UE of FIG. 22 corresponds to the UE of the FIG. 3.

The transceiver 2210 collectively refers to a UE receiver and a UE transmitter, and may transmit/receive a signal to/from a base station or a network entity. The signal transmitted or received to or from the base station or a network entity may include control information and data. The transceiver 2210 may include a RF transmitter for up-converting and amplifying a frequency of a transmitted signal, and a RF receiver for amplifying low-noise and down-converting a frequency of a received signal. However, this is only an example of the transceiver 2210 and components of the transceiver 2210 are not limited to the RF transmitter and the RF receiver.

Also, the transceiver 2210 may receive and output, to the processor 2230, a signal through a wireless channel, and transmit a signal output from the processor 2230 through the wireless channel.

The memory 2220 may store a program and data required for operations of the UE. Also, the memory 2220 may store control information or data included in a signal obtained by the UE. The memory 2220 may be a storage medium, such as read-only memory (ROM), random access memory (RAM), a hard disk, a CD-ROM, and a DVD, or a combination of storage media.

The processor 2230 may control a series of processes such that the UE operates as described above. For example, the transceiver 2210 may receive a data signal including a control signal transmitted by the base station or the network entity, and the processor 2230 may determine a result of receiving the control signal and the data signal transmitted by the base station or the network entity.

Figure 23:
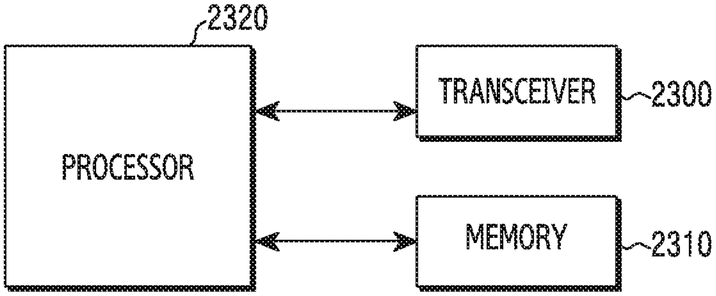
FIG. 23 is a structure of a base station according to an embodiment of the disclosure.

FIG. 23 is a structure of a base station according to an embodiment of the disclosure.

As shown in FIG. 23, the base station according to an embodiment may include a transceiver 2310, a memory 2320, and a processor 2330. The transceiver 2310, the memory 2320, and the processor 2330 of the base station may operate according to a communication method of the base station described above. However, the components of the base station are not limited thereto. For example, the base station may include more or fewer components than those described above. In addition, the processor 2330, the transceiver 2310, and the memory 2320 may be implemented as a single chip. Also, the processor 2330 may include at least one processor. Furthermore, the base station of FIG. 23 corresponds to the BS of the FIG. 2.

The transceiver 2310 collectively refers to a base station receiver and a base station transmitter, and may transmit/receive a signal to/from a terminal(UE) or a network entity. The signal transmitted or received to or from the terminal or a network entity may include control information and data. The transceiver 2310 may include a RF transmitter for up-converting and amplifying a frequency of a transmitted signal, and a RF receiver for amplifying low-noise and down-converting a frequency of a received signal. However, this is only an example of the transceiver 2310 and components of the transceiver 2310 are not limited to the RF transmitter and the RF receiver.

Also, the transceiver 2310 may receive and output, to the processor 2330, a signal through a wireless channel, and transmit a signal output from the processor 2330 through the wireless channel.

The memory 2320 may store a program and data required for operations of the base station. Also, the memory 2320 may store control information or data included in a signal obtained by the base station. The memory 2320 may be a storage medium, such as read-only memory (ROM), random access memory (RAM), a hard disk, a CD-ROM, and a DVD, or a combination of storage media.

The processor 2330 may control a series of processes such that the base station operates as described above. For example, the transceiver 2310 may receive a data signal including a control signal transmitted by the terminal, and the processor 2330 may determine a result of receiving the control signal and the data signal transmitted by the terminal.

It should be understood that, although the steps in the flowcharts in the accompanying drawings are described successively in an order indicated by the arrows, those steps may not be successively executed in the order indicated by the arrows. Unless otherwise stated, the execution of those steps is not limited to a specific order and they may be executed in other orders. Moreover, at least part of the steps in the flowcharts of the accompanying drawings may include a plurality of sub-steps or a plurality of sub-stages. Those sub-steps or sub-stages may be executed at different moments rather than at a same moment. Those sub-steps or sub-stages may not be executed successively, and instead, they may be executed alternately with other steps or with at least part of sub-steps or sub-stages of other steps.

It is to be noted that, the computer-readable medium described in the present disclosure may be a computer-readable signal medium, a computer-readable storage medium or any combination of the both. For example, the computer-readable storage medium may be, but not be limited to: electrical, magnetic, optical, electromagnetic, infrared or semiconductor systems, apparatuses or devices, or a combination thereof. A more specific example of the computer-readable storage medium may include, but not limited to: electric connections having one or more leads, portable computer disks, hard disks, RAMs, ROMs, EPROMs or flash memories, optical fiber, portable CD-ROMs, optical storage devices, magnetic storage devices or any suitable combination thereof. In the present disclosure, the computer-readable storage medium can be any tangible medium containing or stored with programs. The programs can be used by an instruction execution system, apparatus or device or used with the instruction execution system, apparatus or device. In the present disclosure, the computer-readable signal medium may include data signals propagated in basebands or as part of carriers, in which computer-readable program codes are carried. The propagated data signals may be in various forms, including but not limited to electromagnetic signals, optical signals or any suitable combination thereof. The computer-readable signal medium may also be any computer-readable medium except for computer-readable storage mediums. The computer-readable signal medium can send, propagate or transmit programs for use by an instruction execution system, apparatus or device or for use with the instruction execution system, apparatus or device. The program codes contained in the computer-readable medium may be transmitted by any suitable medium, including but not limited to: wires, optical cables, RF, or any suitable combination thereof.

The computer-readable medium may be included in the electronic device, or may exist alone without being assembled into the electronic device.

The computer-readable medium carries one or more programs that, when executed by the electronic device, cause the electronic device to execute the methods described in the above embodiments.

The computer program codes for executing the operations in the present disclosure can be written in one or more programming languages or combinations thereof, including object-oriented programming languages such as Java, Smalltalk or C++, and conventional procedural programming languages such as “C” language or similar programming languages. The program codes may be executed entirely on the user’s computer, partly on the user’s computer, as a stand-alone software package, partly on the user’s computer and partly on a remote computer, or entirely on a remote computer or server. In a scenario involving the remote computer, the remote computer may be connected to the user’s computer through any type of network, including a local area network (LAN) or a wide area network (WAN), or may be connected to an external computer (for example, through the Internet using an Internet service provider).

The flowcharts and block diagrams in the accompanying drawings illustrate the architecture, functionality and operation of possible implementations of systems, methods and computer program products according to various embodiments of the present disclosure. In this regard, each block in the flowcharts or block diagrams may represent a module, a program segment or a part of a code, which includes one or more executable instructions for implementing the specified logical function. It is to be noted that, in some alternative implementations, the functions marked in the blocks may occur in an order different from that marked in the drawings. For example, two successive blocks may actually be executed substantially concurrently, or may sometimes be executed in a reverse order, depending upon the functions involved. It will also be noted that each block of the block diagrams and/or flowchart illustration, and combinations of blocks in the block diagrams and/or flowchart illustration, can be implemented by special purpose hardware-based systems that perform the specified functions or operations, or combinations of special purpose hardware and computer instructions.

The modules involved in the embodiments of the present disclosure may be implemented by software or hardware or any combination thereof. The name of the module does not define the module itself in some cases. For example, the receiving module may also be described as “a module configured to receive an access request from a target UE”.

In the embodiments of the present disclosure, the methods executed by electronic devices can be executed by artificial intelligence models.

According to the embodiments of the present disclosure, the method executed in the electronic device can obtain output data identifying images or image features in images using image data or video data as input data of the artificial intelligence model.

The artificial intelligence model can be obtained by training. Here, “obtained by training” may refer, for example, to the basic artificial intelligent model being trained by multiple pieces of training data through a training algorithm to obtain a predefined operation rule or artificial intelligent model configured to execute desired features (or objectives). The artificial intelligent model may include a plurality of neural network layers. Each of the plurality of neural network layers includes a plurality of weights, and neural network calculation is executed using the result of calculation in the previous layer and the plurality of weights.

Visual understanding may refer to a technology for recognizing and processing objects lick human vision, and includes, for example, objective recognition, object tracking, image retrieval, human recognition, scene recognition, 3D reconstruction/positioning or image enhancement.

For the apparatuses provided by the present disclosure, at least one of the plurality of modules can be realized by an AI model. The functions associated with AI can be executed by a non-volatile memory, a volatile memory and a processor.

The processor may comprise one or more processors. In this case, the one or more processor may be a general-purpose processor (e.g., a CPU, an application processor (AP), etc.), or a pure graphics processing unit (e.g., a graphics processing unit (GPU), a visual processing unit (VPU)), and/or an AI specific processor (e.g., a neural processing unit (NPU)).

The one or more processors control the processing of the input data according to the predefined operation rule or AI model stored in the non-volatile memory and the volatile memory. The predefined operation rule or AI model is provided by training or learning.

Here, providing by learning may refer, for example, to the predefined operation rule or AI model with desired features being obtained by applying a learning algorithm to multiple pieces of learning data. The learning may be executed in the device in which the AI according to the embodiments is executed, and/or may be implemented by a separate server/system.

The AI model may include a plurality of neural network layers. Each layer has a plurality of weights, and the calculation in one layer is executed using the result of calculation in the previous layer and the plurality of weights of the current layer. Examples of the neural network include, but not limited to: convolutional neural networks (CNNs), deep neural networks (DNNs), cyclic neural networks (RNNs), restricted Boltzmann machines (RBMs), deep belief networks (DBNs), bidirectional cyclic deep neural networks (BRDNNs), generative confrontation networks (GANs) and deep Q networks.

The learning algorithm is a method of training a predetermined target apparatus (e.g., a robot) using multiple pieces of learning data to enable, allow or control the target apparatus to determine or predict. Examples of the learning algorithm include, but not limited to: supervised learning, semi-supervised learning or reinforced learning.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of carrier management, comprising:

receiving an access request from a target user equipment (UE);

acquiring from a historical correspondence among each candidate component carrier (CC), each reference signal received power (RSRP) range and a maximum value of a per-resource block (RB) throughput, the maximum value of the per-RB throughput within each RSRP range corresponding to each candidate CC;

determining, from candidate component carriers (CCs), a primary cell (Pcell) of the target UE based on the maximum value of the per RB throughput corresponding to each candidate CC; and performing data transmission by allocating service data for the target UE to at least one CC including the determined Pcell.

2. The method of claim 1, further comprising determining the historical correspondence based on the RSRP value reported by an existing UE in each candidate CC and the per-RB throughput determined during data transmission.

3. The method of claim 2, further comprising determining the corresponding per-RB throughput based on data transmission information of the existing UE in the candidate CC;

determining a corresponding RSRP range based on the RSRP value reported by the existing UE in the candidate CC; and updating, based on the per-RB throughput of the existing UE, the maximum value of the per-RB throughput corresponding to the candidate CC and the determined RSRP range.

4. The method of claim 3, wherein a number of RSRP ranges corresponding to each candidate CC is the same as the number of modulation and coding scheme (MCS) levels; and, the minimum RSRP value corresponding to each MCS level is the minimum RSRP value within an RSRP range corresponding to a corresponding candidate CC, and the maximum RSRP value corresponding to each MCS level is the maximum RSRP value within an RSRP range corresponding to a corresponding candidate CC.

5. The method of claim 3, further comprising each time the existing UE in the candidate CC completes a data transmission, calculating the per-RB throughput of the UE during present data transmission based on the number of RBs scheduled by the present data transmission, transmission block size (TBS) and duration of one transmission time interval (TTI); and determining, from the historical correspondence, the maximum value of the per-RB throughput corresponding to the determined RSRP range; and based on the per-RB throughput of the UE during the present data transmission being greater than the maximum value of the per-RB throughput corresponding to the determined RSRP range, updating the per-RB throughput corresponding to the determined RSRP range as the per-RB throughput of the UE during the present data transmission.

6. The method of claim 2,:

wherein, based on the number of times when the difference of the maximum value of the per-RB throughput stored within each RSRP range in the historical correspondence before and after updating being less than a preset update threshold reaches a preset activation threshold, determining that the historical correspondence is in an activated state.

7. The method of claim 2, further comprising determining, based on an RSRP value reported by the target UE and from the historical correspondence, the maximum value of the per-RB throughput within an RSRP range corresponding to the RSRP value;

based on the resource utilization information of candidate CCs, the number of RBs of CCs and the maximum value of the per-RB throughput corresponding to the RSRP value reported by the target UE, screening candidate CCs to obtain a candidate CC set including at least one candidate CC; and determining a Pcell of the target UE from the candidate CC set.

8. The method of claim 2, further comprising determining, based on the RSRP value reported by the target UE and from the historical correspondence, candidate CCs corresponding to the RSRP value;

for each candidate CC corresponding to the RSRP value reported by the target UE, determining a proportion value of the candidate CC based on the number of UEs accessed by the candidate CC and resource utilization information; and determining, from the candidate CCs corresponding to the RSRP value reported by the target UE, a Pcell of the target UE based on the proportion value.

9. The method of claim 8, further comprising based on a first weight corresponding to the number of accessed UEs and a second weight corresponding to the resource utilization information, determining a weighted sum of the candidate CC;

based on the first weight being less than the second weight, using the reciprocal of the weighted sum as the proportion value of the candidate CC; and based on the first weight being greater than the second weight, using the weighted sum as the proportion value of the candidate CC.

10. The method of claim 1, further comprising:

acquiring at least one candidate allocation strategy for allocating service data to be allocated to at least one candidate CC;

determining throughput information and transmission delay related information corresponding to the at least one candidate allocation strategy;

determining a target allocation strategy based on the throughput information and the transmission delay related information; and allocating the service data to be allocated based on the target allocation strategy.

11. The method of claim 10, further comprising executing, for each candidate allocation strategy, based on remaining service data corresponding to each candidate CC and newly added service data corresponding to each candidate CC after the allocation of the service data to be allocated, determining the total throughput of all candidate CCs.

12. The method of claim 10, wherein the transmission delay related information comprises mean delay information and/or delay difference information; and the determining transmission delay related information corresponding to the at least one candidate allocation strategy comprises:

executing, for each candidate allocation strategy, determining a mean delay of all UEs based on the service data to be allocated being allocated to each candidate CC; and/or executing, for each candidate allocation strategy, determining delay difference information of all UEs based on the service data to be allocated being allocated to each candidate CC.

13. The method of claim 11, further comprising determining the remaining service data corresponding to each candidate CC based on the last service data transmission being completed before the current moment;

determining the newly added service data corresponding to each candidate CC based on the allocation of the service data to be allocated; and determining all service data of the candidate CC at the current moment based on the maximum transmission ability, the remaining service data and the newly added service data of each candidate CC, and determining the total throughput of all candidate CCs based on the all service data.

14. The method of claim 10, further comprising dividing the candidate allocation strategy into a plurality of subsets;

determining a candidate allocation strategy with an optimal allocation effect value in each subset based on the throughput information and the transmission delay related information; and determining a target allocation strategy from the candidate allocation strategy with an optimal allocation effect value corresponding to each subset.

15. The method of claim 14, further comprising executing, for candidate allocation strategies included in each subset:

selecting a preset number of candidate allocation strategies as initial allocation strategies in the current subset; and based on the throughput information and transmission delay related information corresponding to the initial allocation strategies, iteratively calculating allocation effect values of candidate allocation strategies in the current subset, and determining a candidate allocation strategy with an optimal allocation effect value in the current subset.

16. The method of claim 15, further comprising based on the throughput information and transmission delay related information corresponding to each initial allocation strategy, determining a first allocation effect value corresponding to each initial allocation strategy and a difference between every two first allocation effect values;

determining an iteration strategy based on two first allocation effect values corresponding to the maximum difference, and iteratively determining, based on the iteration strategy, allocation effect values corresponding to candidate allocation strategies in the current subset until the difference between maximum first allocation effect values obtained by adjacent preset times of iterations is less than a preset iteration threshold; and using the candidate allocation strategy corresponding to the maximum first allocation effect value finally obtained by iterations as a candidate allocation strategy with an optimal allocation effect value in the current subset.

17. The method of claim 1, further comprising:

acquiring at least one candidate allocation strategy for allocating service data to be allocated to at least one candidate CC;

determining throughput information and transmission delay related information corresponding to the at least one candidate allocation strategy;

determining a target allocation strategy based on the throughput information and the transmission delay related information; and allocating the service data to be allocated based on the target allocation strategy.

18. An electronic device comprising:

at least one transceiver comprising circuitry;

at least one processor, comprising processing circuitry, communicatively coupled to the at least one transceiver; and at least one memory, communicatively coupled to the at least one processor, storing instructions executable by the at least one processor individually and/or in any combination to cause the electronic device to:

receive an access request from a target user equipment (UE);

acquire, from a historical correspondence among each candidate component carrier (CC), each reference signal received power (RSRP) range and a maximum value of a per-resource block (RB) throughout, the maximum value of the per-RB throughout within each RSRP range corresponding to each candidate CC;

determine, from candidate component carriers (CCs), a primary cell (Pcell) of the target UE based on the maximum value of a per-RB throughput corresponding to each candidate CC; and perform data transmission by allocating service data for the target UE to at least one CC including the determined Pcell.

19. The electronic device of claim 18, wherein the instructions further cause the electronic device to:

acquire at least one candidate allocation strategy for allocating service data to be allocated to at least one candidate CC;

determine throughput information and transmission delay related information corresponding to the at least one candidate allocation strategy;

determine a target allocation strategy based on the throughput information and the transmission delay related information; and allocate the service data to be allocated based on the target allocation strategy.

* * * * *